(12) United States Patent
Isogawa et al.

(10) Patent No.: US 9,205,309 B2
(45) Date of Patent: Dec. 8, 2015

(54) GOLF BALL

(75) Inventors: Kazuhiko Isogawa, Kobe (JP); Yoshiko Matsuyama, Kobe (JP); Kosuke Tachibana, Kobe (JP)

(73) Assignee: DUNLOP SPORTS CO. LTD., Kobe-shi (JP)

( * ) Notice: Subject to any disclaimer, the term of this patent is extended or adjusted under 35 U.S.C. 154(b) by 676 days.

(21) Appl. No.: 13/445,956

(22) Filed: Apr. 13, 2012

(65) Prior Publication Data

US 2013/0005506 A1 Jan. 3, 2013

(30) Foreign Application Priority Data

Jun. 29, 2011 (JP) .................................. 2011-144520

(51) Int. Cl.
| | |
|---|---|
| *A63B 37/06* | (2006.01) |
| *A63B 37/00* | (2006.01) |
| *C08K 5/098* | (2006.01) |
| *C08K 5/14* | (2006.01) |

(52) U.S. Cl.
CPC ......... *A63B 37/0092* (2013.01); *A63B 37/0003* (2013.01); *A63B 37/0051* (2013.01); *C08K 5/098* (2013.01); *C08K 5/14* (2013.01); *A63B 37/008* (2013.01); *A63B 37/0031* (2013.01); *A63B 37/0033* (2013.01); *A63B 37/0043* (2013.01); *A63B 37/0045* (2013.01); *A63B 37/0063* (2013.01); *A63B 37/0076* (2013.01); *A63B 37/0083* (2013.01); *A63B 37/06* (2013.01)

(58) Field of Classification Search
CPC .................... A63B 37/0062; A63B 37/0063

USPC .......................................................... 473/377
See application file for complete search history.

(56) References Cited

U.S. PATENT DOCUMENTS

| | | | | |
|---|---|---|---|---|
| 5,033,748 | A | * | 7/1991 | Ebisuno ........................ 473/372 |
| 5,403,010 | A | | 4/1995 | Yabuki et al. |
| 6,390,936 | B1 | | 5/2002 | Sugimoto |
| 7,294,068 | B2 | * | 11/2007 | Higuchi et al. ................ 473/376 |
| 7,344,455 | B1 | | 3/2008 | Higuchi |
| 2003/0216193 | A1 | * | 11/2003 | Graves et al. .................. 473/351 |
| 2006/0135287 | A1 | | 6/2006 | Kennedy, III et al. |
| 2007/0173607 | A1 | | 7/2007 | Kennedy, III et al. |

(Continued)

FOREIGN PATENT DOCUMENTS

| | | |
|---|---|---|
| JP | 61-037178 A | 2/1986 |
| JP | 61-113475 A | 5/1986 |

(Continued)

*Primary Examiner* — Raeann Gorden
(74) *Attorney, Agent, or Firm* — Birch Stewart Kolasch & Birch, LLP

(57) ABSTRACT

A golf ball 2 includes a core 4, a mid layer 6 positioned outside the core 4, a reinforcing layer 8 positioned outside the mid layer 6, and a cover 10 positioned outside the reinforcing layer 8. The core 4 is obtained by a rubber composition being crosslinked. The rubber composition includes a base rubber, a co-crosslinking agent, a crosslinking initiator, and a carboxylate. The co-crosslinking agent is: (1) an $\alpha$, $\beta$-unsaturated carboxylic acid having 3 to 8 carbon atoms; and/or (2) a metal salt of an $\alpha$, $\beta$-unsaturated carboxylic acid having 3 to 8 carbon atoms. The amount of the carboxylate is equal to or greater than 1.0 parts by weight but less than 40 parts by weight per 100 parts by weight of the base rubber. A hardness of the mid layer 6 is greater than a hardness of the cover 10.

17 Claims, 2 Drawing Sheets

(56) References Cited

U.S. PATENT DOCUMENTS

| | | |
|---|---|---|
| 2008/0020864 A1 | 1/2008 | Shindo et al. |
| 2008/0194357 A1 | 8/2008 | Higuchi |
| 2008/0194358 A1 | 8/2008 | Higuchi |
| 2008/0194359 A1 | 8/2008 | Higuchi et al. |
| 2008/0214324 A1 | 9/2008 | Nanba et al. |
| 2008/0214325 A1 | 9/2008 | Higuchi et al. |
| 2008/0312008 A1 | 12/2008 | Higuchi et al. |
| 2009/0124757 A1 | 5/2009 | Shindo et al. |
| 2010/0273575 A1* | 10/2010 | Watanabe ............... 473/373 |
| 2011/0143861 A1 | 6/2011 | Watanabe et al. |

FOREIGN PATENT DOCUMENTS

| | | |
|---|---|---|
| JP | 8-322964 A | 12/1996 |
| JP | 2000-84118 A | 3/2000 |
| JP | 2009-11436 A | 1/2009 |
| JP | 2011-120898 A | 6/2011 |

* cited by examiner

GOLF BALL

This application claims priority on Patent Application No. 2011-144520 filed in JAPAN on Jun. 29, 2011. The entire contents of this Japanese Patent Application are hereby incorporated by reference.

BACKGROUND OF THE INVENTION

1 Field of the Invention

The present invention relates to golf balls. Specifically, the present invention relates to golf balls that include a solid core, a mid layer, and a cover.

2 Description of the Related Art

Golf players' foremost requirement for golf balls is flight performance. In particular, golf players place importance on flight performance upon a shot with a driver. Flight performance correlates with the resilience performance of a golf ball. When a golf ball having excellent resilience performance is hit, the golf ball flies at a high speed, thereby achieving a large flight distance. Golf balls that include a core having excellent resilience performance are disclosed in JPS61-37178, JP2008-212681 (US2008/0214324), JP2008-523952 (US2006/0135287 and US2007/0173607), and JP2009-119256 (US2009/0124757).

The core disclosed in JPS61-37178 is obtained from a rubber composition that includes a co-crosslinking agent and a crosslinking activator. This publication discloses palmitic acid, stearic acid, and myristic acid as the crosslinking activator.

The core disclosed in JP2008-212681 is obtained from a rubber composition that includes an organic peroxide, a metal salt of an $\alpha,\beta$-unsaturated carboxylic acid, and a copper salt of a fatty acid.

The core disclosed in JP2008-523952 is obtained from a rubber composition that includes a metal salt of, an unsaturated monocarboxylic acid, a free radical initiator, and a non-conjugated diene monomer.

The core disclosed in JP2009-119256 is obtained from a rubber composition that includes a polybutadiene whose vinyl content is equal to or less than 2%, whose cis 1,4-bond content is equal to or greater than 80%, and which has an active end modified with an alkoxysilane compound.

An appropriate trajectory height is required in order to achieve a large flight distance. A trajectory height depends on a spin rate and a launch angle. In a golf ball that achieves a high trajectory by a high spin rate, a flight distance is insufficient. In a golf ball that achieves a high trajectory by a high launch angle, a large flight distance is obtained. Use of an outer-hard/inner-soft structure in a golf ball can achieve a low spin rate and a high launch angle. Modifications regarding a hardness distribution of a core are disclosed in JPH6-154357 (U.S. Pat. No. 5,403,010), JP2008-194471 (U.S. Pat. No. 7,344,455, US2008/0194358, US2008/0194359, and US2008/0214325), and JP2008-194473 (US2008/0194357 and US2008/0312008).

In the core disclosed in JPH6-154357, a JIS-C hardness H1 at the central point of the core is 58 to 73, a JIS-C hardness H2 in a region that extends over a distance range from equal to or greater than 5 mm to equal to or less than 10 mm from the central point of the core is equal to or greater than 65 but equal to or less than 75, a JIS-C hardness H3 at a point located at a distance of 15 mm from the central point is equal to or greater than 74 but equal to or less than 82, and a JIS-C hardness H4 at the surface of the core is equal to or greater than 76 but equal to or less than 84. The hardness H2 is greater than the hardness H1, the hardness H3 is greater than the hardness H2, and the hardness H4 is equal to or greater than the hardness H3.

In the core disclosed in JP2008-194471, a Shore D hardness at the central point of the core is equal to or greater than 30 but equal to or less than 48, a Shore D hardness at a point located at a distance of 4 mm from the central point is equal to or greater than 34 but equal to or less than 52, a Shore D hardness at a point located at a distance of 8 mm from the central point is equal to or greater than 40 but equal to or less than 58, a Shore D hardness at a point located at a distance of 12 mm from the central point is equal to or greater than 43 but equal to or less than 61, a Shore D hardness in a region that extends over a distance range from equal to or greater than 2 mm to equal to or less than 3 mm from the surface of the core is equal to or greater than 36 but equal to or less than 54, and a Shore D hardness at the surface of the core is equal to or greater than 41 but equal to or less than 59.

In the core disclosed in JP2008-194473, a Shore D hardness at the central point of the core is equal to or greater than 25 but equal to or less than 45, a Shore D hardness in a region that extends over a distance range from equal to or greater than 5 mm to equal to or less than 10 mm from the central point is equal to or greater than 39 but equal to or less than 58, a Shore D hardness at a point located at a distance of 15 mm from the central point is equal to or greater than 36 but equal to or less than 57, and a Shore D hardness at the surface of the core is equal to or greater than 55 but equal to or less than 75.

JP2010-253268 (US2010/0273575) discloses a golf ball that includes a core, an envelope layer, a mid layer, and a cover. In the core, the hardness gradually increases from the central point of the core to the surface of the core. The difference between a JIS-C hardness at the surface and a JIS-C hardness at the central point is equal to or greater than 15. The hardness of the cover is greater than the hardness of the mid layer, and the hardness of the mid layer is greater than the hardness of the envelope layer.

Golf players also place importance on spin performance of golf balls. When a backspin rate is high, the run is short. It is easy for golf players to cause a golf ball, to which backspin is easily provided, to stop at a target point. When a sidespin rate is high, the golf ball tends to curve. It is easy for golf players to intentionally cause a golf ball, to which sidespin is easily provided, to curve. A golf ball to which spin is easily provided has excellent controllability. In particular, advanced golf players place importance on controllability upon a shot with a short iron.

As described above, when a golf ball having a high launch angle and a low spin rate is hit with a driver, a large flight distance is obtained. However, a golf ball having a low spin rate has inferior controllability. Golf players desire achievement of both a desired flight distance and desired controllability.

An object of the present invention is to provide a golf ball having excellent flight performance upon a shot with a driver and excellent controllability upon a shot with a short iron.

SUMMARY OF THE INVENTION

A golf ball according to the present invention comprises a spherical core, a mid layer positioned outside the core, and a cover positioned outside the mid layer. The core is obtained by a rubber composition being crosslinked. The rubber composition includes:

(a) a base rubber;
(b) a co-crosslinking agent;
(c) a crosslinking initiator; and
(d) a carboxylate.

The co-crosslinking agent (b) is:
(b1) an α,β-unsaturated carboxylic acid having 3 to 8 carbon atoms; and/or
(b2) a metal salt of an α,β-unsaturated carboxylic acid having 3 to 8 carbon atoms.

An amount of the carboxylate (d) is equal to or greater than 1.0 parts by weight but less than 40 parts by weight per 100 parts by weight of the base rubber (a). A Shore D hardness Hm of the mid layer is greater than a Shore D hardness Hc of the cover.

In the golf ball according to the present invention, a hardness distribution is appropriate. In the golf ball, the energy loss is low when being hit. The golf ball has excellent resilience performance. When the golf ball is hit with a driver, the spin rate is low. The great resilience performance and the low spin rate achieve a large flight distance. When the golf ball is hit with a short iron, the spin rate is high. The golf ball has excellent controllability.

Preferably, the rubber composition further includes an organic sulfur compound (e).

When the rubber composition includes the α,β-unsaturated carboxylic acid (b1), the rubber composition further includes a metal compound (f).

Preferably, the carboxylate (d) is a fatty acid salt. Particularly preferably, the carboxylate (d) is a salt of a saturated fatty acid. Preferably, a carbon number of a fatty acid component of the fatty acid salt is equal to or greater than 1 but equal to or less than 30.

Preferably, the organic sulfur compound (e) is a thiophenol, a diphenyl disulfide, a thionaphthol, or a thiuram disulfide, or a metal salt thereof. Particularly preferably, the organic sulfur compound (e) is 2-naphthalenethiol.

Preferably, the rubber composition includes the metal salt (b2) of the α,β-unsaturated carboxylic acid.

Preferably, the rubber composition includes 15 parts by weight or greater but 50 parts by weight or less of the co-crosslinking agent (b) per 100 parts by weight of the base rubber (a). Preferably, the rubber composition includes 0.2 parts by weight or greater but 5.0 parts by weight or less of the crosslinking initiator (c) per 100 parts by weight of the base rubber (a). Preferably, the rubber composition includes 0.05 parts by weight or greater but 5.0 parts by weight or less of the organic sulfur compound (e) per 100 parts by weight of the base rubber (a).

Preferably, a JIS-C hardness H(0) at a central point of the core is equal to or greater than 40 but equal to or less than 70, and a JIS-C hardness H(100) at a surface of the core is equal to or greater than 78 but equal to or less than 96. Preferably, a difference (H(100)−H(0)) between the hardness H(100) and the hardness H(0) is equal to or greater than 15.

Preferably, a difference (Hm−Hc) between the hardness Hm and the hardness Hc is equal to or greater than 30. Preferably, the hardness Hm is equal to or greater than 55 but equal to or less than 70. Preferably, the hardness Hc is equal to or greater than 10 but equal to or less than 48.

Preferably, a thickness of the mid layer is equal to or greater than 0.5 mm but equal to or less than 1.6 mm, and a thickness of the cover is equal to or less than 0.8 mm.

The mid layer may be formed from a resin composition, and the cover may be formed from a resin composition whose base resin is different from a base resin of the mid layer. Preferably, the golf ball further comprises a reinforcing layer between the mid layer and the cover.

Preferably, when distances (%) from a central point of the core to nine points and JIS-C hardnesses at the nine points, which are obtained by dividing a region from the central point of the core to a surface of the core at intervals of 12.5% of a radius of the core, are plotted in a graph, $R^2$ of a linear approximation curve obtained by a least-square method is equal to or greater than 0.95.

DESCRIPTION OF THE PREFERRED EMBODIMENTS

The following will describe in detail the present invention, based on preferred embodiments with reference to the accompanying drawings.

Figure 1:
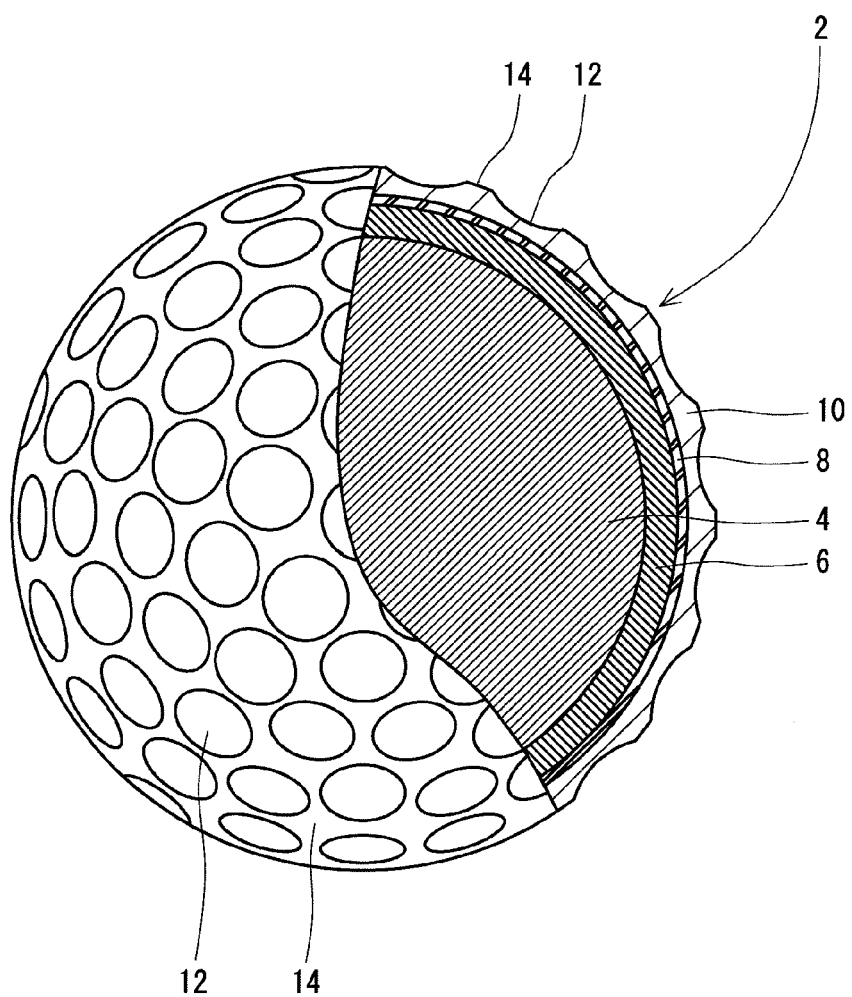
FIG. 1 is a partially cutaway cross-sectional view of a golf ball according to one embodiment of the present invention.

A golf ball 2 shown in FIG. 1 includes a spherical core 4, a mid layer 6 positioned outside the core 4, a reinforcing layer 8 positioned outside the mid layer 6, and a cover 10 positioned outside the reinforcing layer 8. On the surface of the cover 10, a large number of dimples 12 are formed. Of the surface of the golf ball 2, a part other than the dimples 12 is a land 14. The golf ball 2 includes a paint layer and a mark layer on the external side of the cover 10 although these layers are not shown in the drawing.

The golf ball 2 has a diameter of 40 mm or greater but 45 mm or less. From the standpoint of conformity to the rules established by the United States Golf Association (USGA), the diameter is preferably equal to or greater than 42.67 mm. In light of suppression of air resistance, the diameter is preferably equal to or less than 44 mm and more preferably equal to or less than 42.80 mm. The golf ball 2 has a weight of 40 g or greater but 50 g or less. In light of attainment of great inertia, the weight is preferably equal to or greater than 44 g and more preferably equal to or greater than 45.00 g. From the standpoint of conformity to the rules established by the USGA, the weight is preferably equal to or less than 45.93 g.

The core 4 is obtained by crosslinking a rubber composition. The rubber composition includes:
(a) a base rubber;
(b) a co-crosslinking agent;
(c) a crosslinking initiator; and
(d) a carboxylate.

During heating and forming of the core 4, the base rubber (a) is crosslinked by the co-crosslinking agent (b). The heat of the crosslinking reaction remains near the central point of the core 4. Thus, during heating and forming of the core 4, the temperature at the central portion is high. The temperature gradually decreases from the central point toward the surface. The carboxylate (d) reacts with a metal salt of the co-crosslinking agent (b) to exchange cation. This exchange reaction is likely to take place in the central portion of the core 4 where the temperature is high, and is unlikely to take place near the surface of the core 4. In other words, breaking of metal crosslinks is likely to occur in the central portion of the core 4 and is unlikely to occur near the surface of the core 4. As a result, the crosslinking density of the core 4 increases from its central point toward its surface. The core 4 can achieve an outer-hard/inner-soft structure. Further, when the rubber composition includes an organic sulfur compound (e) together with the carboxylate (d), the gradient of a hardness distribution can be controlled, and the degree of the outer-hard/inner-soft structure of the core 4 can be increased. When the golf ball 2 that includes the core 4 is hit with a driver, the spin rate is low. The golf ball 2 achieves excellent flight performance upon a shot with a driver.

Figure 2:
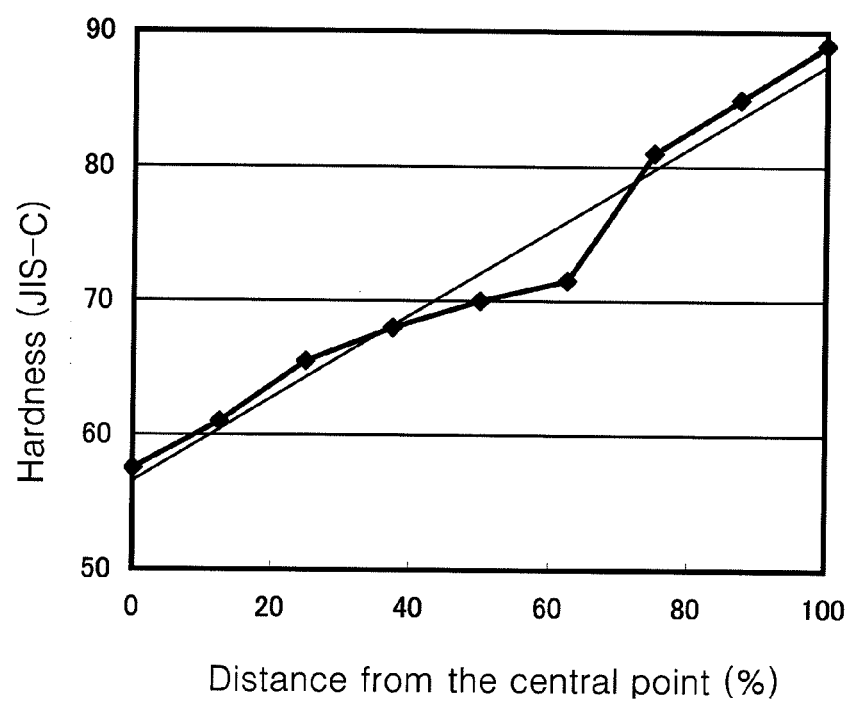
FIG. 2 is a line graph showing a hardness distribution of a core of the golf ball in FIG. 1.

FIG. 2 is a line graph showing a hardness distribution of the core 4 of the golf ball 2 in FIG. 1. The horizontal axis of the graph indicates the ratio (%) of a distance from the central point of the core 4 to the radius of the core 4. The vertical axis of the graph indicates a JIS-C hardness. Nine measuring points obtained by dividing a region from the central point of the core 4 to the surface of the core 4 at intervals of 12.5% of the radius of the core 4 are plotted in the graph. The ratio of the distance from the central point of the core 4 to each of these measuring points to the radius of the core 4 is as follows.

First point: 0.0% (central point)
Second point: 12.5%
Third point: 25.0%
Fourth point: 37.5%
Fifth point: 50.0%
Sixth point: 62.5%
Seventh point: 75.0%
Eighth point: 87.5%
Ninth point: 100.0% (surface)

Hardnesses at the first to eighth points are measured by pressing a JIS-C type hardness scale against a cut plane of the core 4 that has been cut into two halves. A hardness at the ninth point is measured by pressing the JIS-C type hardness scale against the surface of the core 4. For the measurement, an automated rubber hardness measurement machine (trade name "P1", manufactured by Kobunshi Keiki Co., Ltd.), to which this hardness scale is mounted, is used.

FIG. 2 also shows a linear approximation curve obtained by a least-square method on the basis of the distances and the hardnesses of the nine measuring points. As is clear from FIG. 2, the broken line of the hardness distribution does not greatly deviate from the linear approximation curve. In other words, the broken line has a shape close to the linear approximation curve. In the core 4, the hardness linearly increases from its central point to its surface. When the core 4 is hit with a driver, the energy loss is low. The core 4 has excellent resilience performance. When the golf ball 2 is hit with a driver, the flight distance is large.

In the core 4, $R^2$ of the linear approximation curve obtained by the least-square method is equal to or greater than 0.95. $R^2$ is an index indicating the linearity of the broken line. For the core 4 for which $R^2$ is equal to or greater than 0.95, the shape of the broken line of the hardness distribution is close to a straight line. The core 4 for which $R^2$ is equal to or greater than 0.95 has excellent resilience performance. $R^2$ is more preferably equal to or greater than 0.96 and particularly preferably equal to or greater than 0.97. $R^2$ is calculated by squaring a correlation coefficient R. The correlation coefficient R is calculated by dividing the covariance of the distance (%) from the central point and the hardness (JIS-C) by the standard deviation of the distance (%) from the central point and the standard deviation of the hardness (JIS-C).

In the present invention, a JIS-C hardness at a measuring point whose ratio of the distance from the central point of the core 4 to the radius of the core 4 is x % is represented by H(x). The hardness at the central point of the core 4 is represented by H(0), and the surface hardness of the core 4 is represented by H(100). The difference (H(100)−H(0)) between the surface hardness H(100) and the central hardness H(0) is equal to or greater than 15. The difference is great. In other words, the core 4 has an outer-hard/inner-soft structure. When the core 4 is hit with a driver, the recoil (torsional return) is great, and thus spin is suppressed. The core 4 contributes to the flight performance of the golf ball 2. In light of flight performance, the difference (H(100)−H(0)) is more preferably equal to or greater than 25 and particularly preferably equal to or greater than 30. From the standpoint that the core 4 can easily be formed, the difference (H(100)−H(0)) is preferably equal to or less than 50.

Examples of the base rubber (a) of the core 4 include polybutadienes, polyisoprenes, styrene-butadiene copolymers, ethylene-propylene-diene copolymers, and natural rubbers. In light of resilience performance, polybutadienes are preferred. When a polybutadiene and another rubber are used in combination, it is preferred that the polybutadiene is included as a principal component. Specifically, the proportion of the polybutadiene to the entire base rubber is preferably equal to or greater than 50% by weight and more preferably equal to or greater than 80% by weight. The proportion of cis-1,4 bonds in the polybutadiene is preferably equal to or greater than 40% by weight and more preferably equal to or greater than 80% by weight.

A polybutadiene in which the proportion of 1,2-vinyl bonds is equal to or less than 2.0% by weight is preferred. The polybutadiene can contribute to the resilience performance of the core 4. In this respect, the proportion of 1,2-vinyl bonds is preferably equal to or less than 1.7% by weight and particularly preferably equal to or less than 1.5% by weight.

From the standpoint that a polybutadiene having a low proportion of 1,2-vinyl bonds and excellent polymerization activity is obtained, it is preferred that a rare-earth-element-containing catalyst is used for synthesizing a polybutadiene. In particular, a polybutadiene synthesized with a catalyst containing neodymium, which is a lanthanum-series rare earth element compound, is preferred.

The polybutadiene has a Mooney viscosity ($ML_{1+4}$ (100° C.)) of preferably 30 or greater, more preferably 32 or greater, and particularly preferably 35 or greater. The Mooney viscosity ($M_{1+4}$(100° C.)) is preferably equal to or less than 140, more preferably equal to or less than 120, even more preferably equal to or less than 100, and particularly preferably equal to or less than 80. The Mooney viscosity ($ML_{1+4}$(100° C.)) is measured according to the standards of "JIS K6300". The measurement conditions are as follows.

Rotor: L rotor
Preheating time: 1 minute
Rotating time of rotor: 4 minutes
Temperature: 100° C.

In light of workability, the polybutadiene has a molecular weight distribution (Mw/Mn) of preferably 2.0 or greater, more preferably 2.2 or greater, even more preferably 2.4 or greater, and particularly preferably 2.6 or greater. In light of resilience performance, the molecular weight distribution (Mw/Mn) is preferably equal to or less than 6.0, more preferably equal to or less than 5.0, even more preferably equal to or less than 4.0, and particularly preferably equal to or less than 3.4. The molecular weight distribution (Mw/Mn) is calculated by dividing the weight average molecular weight Mw by the number average molecular weight Mn.

The molecular weight distribution is measured by gel permeation chromatography ("HLC-8120GPC" manufactured by Tosoh Corporation). The measurement conditions are as follows.

Detector: differential refractometer
Column: GMHHXL (manufactured by Tosoh Corporation)
Column temperature: 40° C.
Mobile phase: tetrahydrofuran The molecular weight distribution is calculated as a value obtained by conversion using polystyrene standard.

The co-crosslinking agent (b) is:
(b1) an α,β-unsaturated carboxylic acid having 3 to 8 carbon atoms; and/or
(b2) a metal salt of an α,β-unsaturated carboxylic acid having 3 to 8 carbon atoms.

The rubber composition may include only the α,β-unsaturated carboxylic acid (b1) or only the metal salt (b2) of the α,β-unsaturated carboxylic acid as the co-crosslinking agent (b). The rubber composition may include both the α,β-unsaturated carboxylic acid (b1) and the metal salt (b2) of the α,β-unsaturated carboxylic acid as the co-crosslinking agent (b).

The metal salt (b2) of the α,β-unsaturated carboxylic acid graft-polymerizes with the molecular chain of the base rubber, thereby crosslinking the rubber molecules. When the rubber composition includes the α,β-unsaturated carboxylic acid (b1), the rubber composition preferably further includes a metal compound (f). The metal compound (f) reacts with the α,β-unsaturated carboxylic acid (b1) in the rubber composition. A salt obtained by this reaction graft-polymerizes with the molecular chain of the base rubber.

Examples of the metal compound (f) include metal hydroxides such as magnesium hydroxide, zinc hydroxide, calcium hydroxide, sodium hydroxide, lithium hydroxide, potassium hydroxide, and copper hydroxide; metal oxides such as magnesium oxide, calcium oxide, zinc oxide, and copper oxide; and metal carbonates such as magnesium carbonate, zinc carbonate, calcium carbonate, sodium carbonate, lithium carbonate, and potassium carbonate. A compound that includes a bivalent metal is preferred. The compound that includes the bivalent metal reacts with the co-crosslinking agent (b) to form metal crosslinks. The metal compound (f) is particularly preferably a zinc compound. Two or more metal compounds may be used in combination.

Examples of the α,β-unsaturated carboxylic acids include acrylic acid, methacrylic acid, fumaric acid, maleic acid, and crotonic acid. Examples of the metal component in the metal salt (b2) of the α,β-unsaturated carboxylic acid include sodium ion, potassium ion, lithium ion, magnesium ion, calcium ion, zinc ion, barium ion, cadmium ion, aluminum ion, tin ion, and zirconium ion. The metal salt (b2) of the α,β-unsaturated carboxylic acid may include two or more types of ions. From the standpoint that metal crosslinks are likely to occur between the rubber molecules, bivalent metal ions such as magnesium ion, calcium ion, zinc ion, barium ion, and cadmium ion are preferred. The metal salt (b2) of the α,β-unsaturated carboxylic acid is particularly preferably zinc acrylate.

In light of resilience performance of the golf ball 2, the amount of the co-crosslinking agent (b) is preferably equal to or greater than 15 parts by weight and particularly preferably equal to or greater than 20 parts by weight, per 100 parts by weight of the base rubber. In light of feel at impact, the amount is preferably equal to or less than 50 parts by weight, more preferably equal to or less than 45 parts by weight, and particularly preferably equal to or less than 40 parts by weight, per 100 parts by weight of the base rubber.

The crosslinking initiator (c) is preferably an organic peroxide. The organic peroxide contributes to the resilience performance of the golf ball 2. Examples of preferable organic peroxides include dicumyl peroxide, 1,1-bis(t-butylperoxy)-3,3,5-trimethylcyclohexane, 2,5-dimethyl-2,5-di(t-butylperoxy)hexane, and di-t-butyl peroxide. In light of versatility, dicumyl peroxide is preferred.

In light of resilience performance of the golf ball 2, the amount of the crosslinking initiator (c) is preferably equal to or greater than 0.2 parts by weight and particularly preferably equal to or greater than 0.5 parts by weight, per 100 parts by weight of the base rubber. In light of feel at impact and durability of the golf ball 2, the amount is preferably equal to or less than 5.0 parts by weight and particularly preferably equal to or less than 2.5 parts by weight, per 100 parts by weight of the base rubber.

The co-crosslinking agent (b) is not included in the carboxylate (d). The carboxylic acid component of the carboxylate (d) has a carboxyl group. The carboxylic acid component exchanges a cationic component with the co-crosslinking agent (b). It is inferred that the carboxylate (d) breaks the metal crosslinks by the co-crosslinking agent (b) at the central portion of the core 4 during heating and forming of the core 4.

The carbon number of the carboxylic acid component of the carboxylate (d) is preferably equal to or greater than 4 but equal to or less than 30, is more preferably equal to or greater than 9 but equal to or less than 30, and is particularly preferably equal to or greater than 14 but equal to or less than 28. Examples of the carboxylic acid component include aliphatic carboxylic acids (fatty acids) and aromatic carboxylic acids. Fatty acids are preferred. The carbon number of the fatty acid component of the fatty acid salt is preferably equal to or greater than 1 but equal to or less than 30.

The rubber composition may include a salt of a saturated fatty acid or may include a salt of an unsaturated fatty acid salt. The salt of the saturated fatty acid is preferred.

Examples of fatty acids include butyric acid (C4), valeric acid (C5), caproic acid (C6), enanthic acid (C7), caprylic acid (C8), pelargonic acid (C9), capric acid (C10), lauric acid (C12), myristic acid (C14), myristoleic acid (C14), pentadecylic acid (C15), palmitic acid (C16), palmitoleic acid (C16), margaric acid (C17), stearic acid (C18), elaidic acid (C18), vaccenic acid (C18), oleic acid (C18), linolic acid (C18), linolenic acid (C18), 12-hydroxystearic acid (C18), arachidic acid (C20), gadoleic acid (C20), arachidonic acid (C20), eicosenoic acid (C20), behenic acid (C22), erucic acid (C22), lignoceric acid (C24), nervonic acid (C24), cerotic acid (C26), montanic acid (C28), and melissic acid (C30). Two or more fatty acids may be used in combination. Myristic acid, palmitic acid, stearic acid, behenic acid, and oleic acid are preferred.

An aromatic carboxylic acid has an aromatic ring and a carboxyl group. Examples of aromatic carboxylic acids include benzoic acid, phthalic acid, isophthalic acid, terephthalic acid, hemimellitic acid (benzene-1,2,3-tricarboxylic acid), trimellitic acid (benzene-1,2,4-tricarboxylic acid), trimesic acid (benzene-1,3,5-tricarboxylic acid), mellophanic acid (benzene-1,2,3,4-tetracarboxylic acid), prehnitic acid (benzene-1,2,3,5-tetracarboxylic acid), pyromellitic acid (benzene-1,2,4,5-tetracarboxylic acid), mellitic acid (benzene hexacarboxylic acid), diphenic acid (biphenyl-2,2'-dicarboxylic acid), toluic acid (methylbenzoic acid), xylic acid, prehnitylic acid (2,3,4-trimethylbenzoic acid), γ-isodurylic acid (2,3,5-trimethylbenzoic acid), durylic acid (2,4,5-trimethylbenzoic acid), β-isodurylic acid (2,4,6-trimethylbenzoic acid), α-isodurylic acid (3,4,5-trimethylbenzoic acid), cuminic acid (4-isopropylbenzoic acid), uvitic acid (5-methylisophthalic acid), α-toluic acid (phenylacetic acid), hydratropic acid (2-phenylpropanoic acid), and hydrocinnamic acid (3-phenylpropanoic acid).

The rubber composition may include a salt of an aromatic carboxylic acid substituted with a hydroxyl group, an alkoxy group, or an oxo group. Examples of this carboxylic acid can include salicylic acid (2-hydroxybenzoic acid), anisic acid (methoxybenzoic acid), cresotinic acid (hydroxy(methyl) benzoicacid), o-homosalicylic acid (2-hydroxy-3-methylbenzoic acid), m-homosalicylic acid (2-hydroxy-4-methylbenzoic acid), p-homosalicylic acid (2-hydroxy-5-methylbenzoic acid), o-pyrocatechuic acid (2,3-dihydroxybenzoicacid), β-resorcylic acid (2,4-dihydroxybenzoic acid), γ-resorcylic acid (2,6-dihydroxybenzoic acid), protocatechuic acid (3,4-dihydroxybenzoic acid), α-resorcylic acid (3,5-dihydroxybenzoic acid), vanillic acid (4-hydroxy-3-methoxybenzoic acid), isovanillic acid (3-hydroxy-4-methoxybenzoic acid), veratric acid (3,4-dimethoxybenzoic acid), o-veratric acid (2,3-dimethoxybenzoic acid), orsellinic acid (2,4-dihydroxy-6-methylbenzoic acid), m-hemipinic acid (4,5-dimethoxyphthalic acid), gallic acid (3,4,5-trihydroxybenzoic acid), syringic acid (4-hydroxy-3,5-dimethoxybenzoic acid), asaronic acid (2,4,5-trimethoxybenzoic acid), mandelic acid (hydroxy(phenyl)acetic acid), vanillylmandelic acid (hydroxy(4-hydroxy-3-methoxyphenyl)acetic acid), homoanisic acid ((4-methoxyphenyl)acetic acid), homogentisic acid ((2,5-dihydroxyphenyl)acetic acid), homoprotocatechuic acid ((3,4-dihydroxyphenyl)acetic acid), homovanillic acid ((4-hydroxy-3-methoxyphenyl)acetic acid), homoisovanillic acid ((3-hydroxy-4-methoxyphenyl)acetic acid), homoveratric acid ((3,4-dimethoxyphenyl) acetic acid), o-homoveratric acid ((2,3-dimethoxyphenyl) acetic acid), homophthalic acid (2-(carboxymethyl)benzoic acid), homoisophthalic acid (3-(carboxymethyl)benzoic acid), homoterephthalic acid (4-(carboxymethyl)benzoic acid), phthalonic acid (2-(carboxycarbonyl)benzoic acid), isophthalonic acid (3-(carboxycarbonyl)benzoic acid), terephthalonic acid (4-(carboxycarbonyl)benzoic acid), benzilic acid (hydroxydiphenylacetic acid), atrolactic acid (2-hydroxy-2-phenylpropanoic acid), tropic acid (3-hydroxy-2-phenylpropanoic acid), melilotic acid (3-(2-hydroxyphenyl) propanoic acid), phloretic acid (3-(4-hydroxyphenyl) propanoic acid), hydrocaffeic acid (3-(3,4-dihydroxyphenyl) propanoic acid), hydroferulic acid (3-(4-hydroxy-3-methoxyphenyl)propanoic acid), hydroisoferulic acid (3-(3-hydroxy-4-methoxyphenyl)propanoic acid), p-coumaric acid (3-(4-hydroxyphenyl)acrylic acid), umbellic acid (3-(2,4-dihydroxyphenyl)acrylic acid), caffeic acid (3-(3,4-dihydroxyphenyl)acrylic acid), ferulic acid (3-(4-hydroxy-3-methoxyphenyl)acrylic acid), isoferulic acid (3-(3-hydroxy-4-methoxyphenyl) acrylic acid), and sinapic acid (3-(4-hydroxy-3,5-dimethoxyphenyl)acrylic acid).

The cationic component of the carboxylate is a metal ion or an organic cation. Examples of the metal ion include sodium ion, potassium ion, lithium ion, silver ion, magnesium ion, calcium ion, zinc ion, barium ion, cadmium ion, copper ion, cobalt ion, nickel ion, manganese ion, aluminum ion, iron ion, tin ion, zirconium ion, and titanium ion. Two or more types of ions may be used in combination.

The organic cation is a cation having a carbon chain. Examples of the organic cation include organic ammonium ions. Examples of organic ammonium ions include primary ammonium ions such as stearylammonium ion, hexylammonium ion, octylammonium ion, and 2-ethylhexylammonium ion; secondary ammonium ions such as dodecyl(lauryl)ammoniumion, andoctadecyl(stearyl)ammonium ion; tertiary ammonium ions such as trioctylammonium ion; and quaternary ammonium ions such as dioctyldimethylammonium ion, and distearyldimethylammonium ion. Two or more types of organic cations may be used in combination.

Examples of preferable carboxylates include a potassium salt, a magnesium salt, an aluminum salt, a zinc salt, an iron salt, a copper salt, a nickel salt, or a cobalt salt of myristic acid, palmitic acid, stearic acid, behenic acid, or oleic acid.

In light of linearity of the hardness distribution of the core 4, the amount of the carboxylate (d) is preferably equal to or greater than 1.0 parts by weight, more preferably equal to or greater than 7.5 parts by weight, even more preferably equal to or greater than 10.0 parts by weight, and particularly preferably equal to or greater than 12.0 parts by weight, per 100 parts by weight of the base rubber. In light of resilience performance, the amount is preferably less than 40 parts by weight, more preferably equal to or less than 30 parts by weight, and particularly preferably equal to or less than 20 parts by weight, per 100 parts by weight of the base rubber.

The weight ratio of the co-crosslinking agent (b) and the carboxylate (d) in the rubber composition is preferably equal to or greater than 3/7 but equal to or less than 8/2, and is particularly preferably equal to or greater than 4/6 but equal to or less than 7/3. From the rubber composition in which this weight ratio is within the above range, the core 4 whose hardness linearly increases from its central point toward its surface can be obtained.

As the co-crosslinking agent (b), zinc acrylate is preferably used. Zinc acrylate whose surface is coated with zinc stearate for the purpose of improving dispersibility to rubber is present. When the rubber composition includes this zinc acrylate, the zinc stearate serves as the carboxylate (d). For example, when the rubber composition includes 25 parts by weight of zinc acrylate that includes 10% by weight of zinc stearate, the amount of the zinc stearate is regarded as 2.5 parts by weight, and the amount of the zinc acrylate is regarded as 22.5 parts by weight.

The rubber composition preferably further includes an organic sulfur compound (e). The organic sulfur compound (e) can contribute to control of: the linearity of the hardness distribution of the core 4; and the degree of the outer-hard/inner-soft structure. An example of the organic sulfur compound (e) is an organic compound having a thiol group or a polysulfide linkage having 2 to 4 sulfur atoms. A metal salt of this organic compound is also included in the organic sulfur compound (e). Examples of the organic sulfur compound (e) include aliphatic compounds such as aliphatic thiols, aliphatic thiocarboxylic acids, aliphatic dithiocarboxylic acids, and aliphatic polysulfides; heterocyclic compounds; alicyclic compounds such as alicyclic thiols, alicyclic thiocarboxylic acids, alicyclic dithiocarboxylic acids, and alicyclic polysulfides; and aromatic compounds. Specific examples of the organic sulfur compound (e) include thiophenols, thionaphthols, polysulfides, thiocarboxylic acids, dithiocarboxylic acids, sulfenamides, thiurams, dithiocarbamates, and thiazoles. Preferable organic sulfur compounds are thiophenols, diphenyl disulfides, thionaphthols, and thiuram disulfides, and metal salts thereof.

Specific examples of the organic sulfur compound (e) are represented by the following chemical formulas (1) to (4).

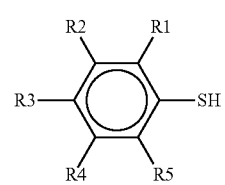

(1)

In the chemical formula (1), R1 to R5 each represent H or a substituent.

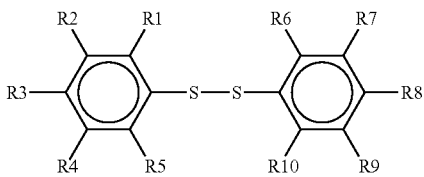

(2)

In the chemical formula (2), R1 to R10 each represent H or a substituent.

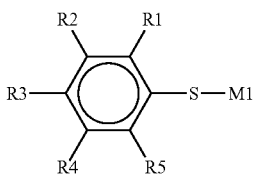

(3)

In the chemical formula (3), R1 to R5 each represent H or a substituent, and M1 represents a monovalent metal atom.

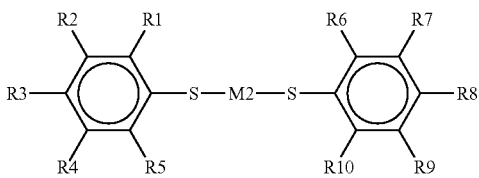

(4)

In the chemical formula (4), R1 to R10 each represent H or a substituent, and M2 represents a bivalent metal atom.

In the formulas (1) to (4), each substituent is at least one group selected from the group consisting of a halogen group (F, Cl, Br, I), an alkyl group, a carboxyl group (—COOH), an ester (—COOR) of a carboxyl group, a formyl group (—CHO), an acyl group (—COR), a carbonyl halide group (—COX), a sulfo group (—SO$_3$H), an ester(—SO$_3$R) of a sulfo group, a sulfonyl halide group (—SO$_2$X), a sulfino group (—SO$_2$H), an alkylsulfinyl group (—SOR), a carbamoyl group (—CONH$_2$), an alkyl halide group, a cyano group (—CN), and an alkoxy group (—OR).

Examples of the organic sulfur compound represented by the chemical formula (1) include thiophenol; thiophenols substituted with halogen groups, such as 4-fluorothiophenol, 2,5-difluorothiophenol, 2,4,5-trifluorothiophenol, 2,4,5,6-tetrafluorothiophenol, pentafluorothiophenol, 2-chlorothiophenol, 4-chlorothiophenol, 2,4-dichlorothiophenol, 2,5-dichlorothiophenol, 2,4,5-trichlorothiophenol, 2,4,5,6-tetrachlorothiophenol, pentachlorothiophenol, 4-bromothiophenol, 2,5-dibromothiophenol, 2,4,5-tribromothiophenol, 2,4,5,6-tetrabromothiophenol, pentabromothiophenol, 4-iodothiophenol, 2,5-diiodothiophenol, 2,4,5-triiodothiophenol, 2,4,5,6-tetraiodothiophenol, and pentaiodothiophenol; thiophenols substituted with alkyl groups, such as 4-methylthiophenol, 2,4,5-trimethylthiophenol, pentamethylthiophenol, 4-t-butylthiophenol, 2,4,5-tri-t-butylthiophenol, and penta-t-butylthiophenol; thiophenols substituted with carboxyl groups, such as 4-carboxythiophenol, 2,4,6-tricarboxythiophenol, and pentacarboxythiophenol; thiophenols substituted with alkoxycarbonyl groups, such as 4-methoxycarbonylthiophenol, 2,4,6-trimethoxycarbonylthiophenol, and pentamethoxycarbonylthiophenol; thiophenols substituted with formyl groups, such as 4-formylthiophenol, 2,4,6-triformylthiophenol, and pentaformylthiophenol; thiophenols substituted with acyl groups, such as 4-acetylthiophenol, 2,4,6-triacetylthiophenol, and pentaacetylthiophenol; thiophenols substituted with carbonyl halide groups, such as 4-chlorocarbonylthiophenol, 2,4,6-tri(chlorocarbonyl)thiophenol, and penta(chlorocarbonyl)thiophenol; thiophenols substituted with sulfo groups, such as 4-sulfothiophenol, 2,4,6-trisulfothiophenol, and pentasulfothiophenol; thiophenols substituted with alkoxysulfonyl groups, such as 4-methoxysulfonylthiophenol, 2,4,6-trimethoxysulfonylthiophenol, and pentamethoxysulfonylthiophenol; thiophenols substituted with sulfonyl halide groups, such as 4-chlorosulfonylthiophenol, 2,4,6-tri(chlorosulfonyl)thiophenol, and penta(chlorosulfonyl)thiophenol; thiophenols substituted with sulfino groups, such as 4-sulfinothiophenol, 2,4,6-trisulfinothiophenol, and pentasulfinothiophenol; thiophenols substituted with alkylsulfinyl groups, such as 4-methylsulfinylthiophenol, 2,4,6-tri(methylsulfinyl)thiophenol, and penta(methylsulfinyl)thiophenol; thiophenols substituted with carbamoyl groups, such as 4-carbamoylthiophenol, 2,4,6-tricarbamoylthiophenol, and pentacarbamoylthiophenol; thiophenols substituted with alkyl halide groups, such as 4-trichloromethylthiophenol, 2,4,6-tri(trichloromethyl)thiophenol, and penta(trichloromethyl)thiophenol; thiophenols substituted with cyano groups, such as 4-cyanothiophenol, 2,4,6-tricyanothiophenol, and pentacyanothiophenol; and thiophenols substituted with alkoxy groups, such as 4-methoxythiophenol, 2,4,6-trimethoxythiophenol, and pentamethoxythiophenol. Each of these thiophenols is substituted with one type of substituent.

Another example of the organic sulfur compound represented by the chemical formula (1) is a compound substituted with at least one type of the above substituents and another substituent. Examples of the other substituent include a nitro group (—NO$_2$), an amino group (—NH$_2$), a hydroxyl group (—OH), and a phenylthio group (—SPh). Specific examples of the compound include 4-chloro-2-nitrothiophenol, 4-chloro-2-aminothiophenol, 4-chloro-2-hydroxythiophenol, 4-chloro-2-phenylthiothiophenol, 4-methyl-2-nitrothiophenol, 4-methyl-2-aminothiophenol, 4-methyl-2-hydroxythiophenol, 4-methyl-2-phenylthiothiophenol, 4-carboxy-2-nitrothiophenol, 4-carboxy-2-aminothiophenol, 4-carboxy-2-hydroxythiophenol, 4-carboxy-2-phenylthiothiophenol, 4-methoxycarbonyl-2-nitrothiophenol, 4-methoxycarbonyl-2-aminothiophenol, 4-methoxycarbonyl-2-hydroxythiophenol, 4-methoxycarbonyl-2-phenylthiothiophenol, 4-formyl-2-nitrothiophenol, 4-formyl-2-aminothiophenol, 4-formyl-2-hydroxythiophenol, 4-formyl-2-phenylthiothiophenol, 4-acetyl-2-nitrothiophenol, 4-acetyl-2-aminothiophenol, 4-acetyl-2-hydroxythiophenol, 4-acetyl-2-phenylthiothiophenol, 4-chlorocarbonyl-2-nitrothiophenol, 4-chlorocarbonyl-2-aminothiophenol, 4-chlorocarbonyl-2-hydroxythiophenol, 4-chlorocarbonyl-2-phenylthiothiophenol, 4-sulfo-2-nitrothiophenol, 4-sulfo-2-aminothiophenol, 4-sulfo-2-hydroxythiophenol, 4-sulfo-2-phenylthiothiophenol, 4-methoxysulfonyl-2-nitrothiophenol, 4-methoxysulfonyl-2-aminothiophenol, 4-methoxysulfonyl-2-hydroxythiophenol, 4-methoxysulfonyl-2-phenylthiothiophenol, 4-chlorosulfonyl-2-nitrothiophenol, 4-chlorosulfonyl-2-aminothiophenol, 4-chlorosulfonyl-2-hydroxythiophenol, 4-chlorosulfonyl-2-phenylthiothiophenol, 4-sulfino-2-nitrothiophenol, 4-sulfino-2-aminothiophenol, 4-sulfino-2-hydroxythiophenol, 4-sulfino-2-phenylthiothiophenol, 4-methylsulfinyl-2- nitrothiophenol, 4-methyl-2-aminosulfinylthiophenol, 4-methylsulfinyl-2-hydroxythiophenol, 4-methylsulfinyl-2-phenylthiothiophenol, 4-carbamoyl-2-nitrothiophenol, 4-carbamoyl-2-aminothiophenol, 4-carbamoyl-2-hydroxythiophenol, 4-carbamoyl-2-phenylthiothiophenol, 4-trichloromethyl-2-nitrothiophenol, 4-trichloromethyl-2-aminothiophenol, 4-trichloromethyl-2-hydroxythiophenol, 4-trichloromethyl-2-phenylthiothiophenol, 4-cyano-2-nitrothiophenol, 4-cyano-2-aminothiophenol, 4-cyano-2-hydroxythiophenol, 4-cyano-2-phenylthiothiophenol, 4-methoxy-2-nitrothiophenol, 4-methoxy-2-aminothiophenol, 4-methoxy-2-hydroxythiophenol, and 4-methoxy-2-phenylthiothiophenol.

Still another example of the organic sulfur compound represented by the chemical formula (1) is a compound substituted with two or more types of substituents. Specific examples of the compound include 4-acetyl-2-chlorothiophenol, 4-acetyl-2-methylthiophenol, 4-acetyl-2-carboxythiophenol, 4-acetyl-2-methoxycarbonylthiophenol, 4-acetyl-2-formylthiophenol, 4-acetyl-2-chlorocarbonylthiophenol, 4-acetyl-2-sulfothiophenol, 4-acetyl-2-methoxysulfonylthiophenol, 4-acetyl-2-chlorosulfonylthiophenol, 4-acetyl-2-sulfinothiophenol, 4-acetyl-2-methylsulfinylthiophenol, 4-acetyl-2-carbamoylthiophenol, 4-acetyl-2-trichloromethylthiophenol, 4-acetyl-2-cyanothiophenol, and 4-acetyl-2-methoxythiophenol.

Examples of the organic sulfur compound represented by the chemical formula (2) include diphenyl disulfide; diphenyl disulfides substituted with halogen groups, such as bis(4-fluorophenyl)disulfide, bis(2,5-difluorophenyl)disulfide, bis(2,4,5-trifluorophenyl)disulfide, bis(2,4,5,6-tetrafluorophenyl)disulfide, bis(pentafluorophenyl)disulfide, bis(4-chlorophenyl)disulfide, bis(2,5-dichlorophenyl)disulfide, bis(2,4,5-trichlorophenyl)disulfide, bis(2,4,5,6-tetrachlorophenyl)disulfide, bis(pentachlorophenyl)disulfide, bis(4-bromophenyl)disulfide, bis(2,5-dibromophenyl)disulfide, bis(2,4,5-tribromophenyl)disulfide, bis(2,4,5,6-tetrabromophenyl)disulfide, bis(pentabromophenyl)disulfide, bis(4-iodophenyl)disulfide, bis(2,5-diiodophenyl)disulfide, bis(2,4,5-triiodophenyl)disulfide, bis(2,4,5,6-tetraiodophenyl)disulfide, and bis(pentaiodophenyl)disulfide; diphenyl disulfides substituted with alkyl groups, such as bis(4-methylphenyl)disulfide, bis(2,4,5-trimethylphenyl)disulfide, bis(pentamethylphenyl)disulfide, bis(4-t-butylphenyl)disulfide, bis(2,4,5-tri-t-butylphenyl)disulfide, and bis(penta-t-butylphenyl)disulfide; diphenyl disulfides substituted with carboxyl groups, such as bis(4-carboxyphenyl)disulfide, bis(2,4,6-tricarboxyphenyl)disulfide, and bis(pentacarboxyphenyl)disulfide; diphenyl disulfides substituted with alkoxycarbonyl groups, such as bis(4-methoxycarbonylphenyl)disulfide, bis(2,4,6-trimethoxycarbonylphenyl)disulfide, and bis(pentamethoxycarbonylphenyl)disulfide; diphenyl disulfides substituted with formyl groups, such as bis(4-formylphenyl)disulfide, bis(2,4,6-triformylphenyl)disulfide, and bis(pentaformylphenyl)disulfide; diphenyl disulfides substituted with acyl groups, such as bis(4-acetylphenyl)disulfide, bis(2,4,6-triacetylphenyl)disulfide, and bis(pentaacetylphenyl)disulfide; diphenyl disulfides substituted with carbonyl halide groups, such as bis(4-chlorocarbonylphenyl)disulfide, bis(2,4,6-tri(chlorocarbonyl)phenyl)disulfide, and bis(penta(chlorocarbonyl)phenyl)disulfide; diphenyl disulfides substituted with sulfo groups, such as bis(4-sulfophenyl)disulfide, bis(2,4,6-trisulfophenyl)disulfide, and bis(pentasulfophenyl)disulfide; diphenyl disulfides substituted with alkoxysulfonyl groups, such as bis(4-methoxysulfonylphenyl)disulfide, bis(2,4,6-trimethoxysulfonylphenyl)disulfide, and bis(pentamethoxysulfonylphenyl)disulfide; diphenyl disulfides substituted with sulfonyl halide groups, such as bis(4-chlorosulfonylphenyl)disulfide, bis(2,4,6-tri(chlorosulfonyl)phenyl)disulfide, and bis(penta(chlorosulfonyl)phenyl)disulfide; diphenyl disulfides substituted with sulfino groups, such as bis(4-sulfinophenyl)disulfide, bis(2,4,6-trisulfinophenyl)disulfide, and bis(pentasulfinophenyl)disulfide; diphenyl disulfides substituted with alkylsulfinyl groups, such as bis(4-methylsulfinylphenyl)disulfide, bis(2,4,6-tri(methylsulfinyl)phenyl)disulfide, and bis(penta(methylsulfinyl)phenyl)disulfide; diphenyl disulfides substituted with carbamoyl groups, such as bis(4-carbamoylphenyl)disulfide, bis(2,4,6-tricarbamoylphenyl)disulfide, and bis(pentacarbamoylphenyl)disulfide; diphenyl disulfides substituted with alkyl halide groups, such as bis(4-trichloromethylphenyl)disulfide, bis(2,4,6-tri(trichloromethyl)phenyl)disulfide, and bis(penta(trichloromethyl)phenyl)disulfide; diphenyl disulfides substituted with cyano groups, such as bis(4-cyanophenyl)disulfide, bis(2,4,6-tricyanophenyl)disulfide, and bis(pentacyanophenyl)disulfide; and diphenyl disulfides substituted with alkoxy groups, such as bis(4-methoxyphenyl)disulfide, bis(2,4,6-trimethoxyphenyl)disulfide, and bis(pentamethoxyphenyl)disulfide. Each of these diphenyl disulfides is substituted with one type of substituent.

Another example of the organic sulfur compound represented by the chemical formula (2) is a compound substituted with at least one type of the above substituents and another substituent. Examples of the other substituent include a nitro group (—NO$_2$), an amino group (—NH$_2$), a hydroxyl group (—OH), and a phenylthio group (—SPh). Specific examples of the compound include bis(4-chloro-2-nitrophenyl)disulfide, bis(4-chloro-2-aminophenyl)disulfide, bis(4-chloro-2-hydroxyphenyl)disulfide, bis(4-chloro-2-phenylthiophenyl)disulfide, bis(4-methyl-2-nitrophenyl)disulfide, bis(4-methyl-2-aminophenyl)disulfide, bis(4-methyl-2-hydroxyphenyl)disulfide, bis(4-methyl-2-phenylthiophenyl)disulfide, bis(4-carboxy-2-nitrophenyl)disulfide, bis(4-carboxy-2-aminophenyl)disulfide, bis(4-carboxy-2-hydroxyphenyl)disulfide, bis(4-carboxy-2-phenylthiophenyl)disulfide, bis(4-methoxycarbonyl-2-nitrophenyl)disulfide, bis(4-methoxycarbonyl-2-aminophenyl)disulfide, bis(4-methoxycarbonyl-2-hydroxyphenyl)disulfide, bis(4-methoxycarbonyl-2-phenylthiophenyl)disulfide, bis(4-formyl-2-nitrophenyl)disulfide, bis(4-formyl-2-aminophenyl)disulfide, bis(4-formyl-2-hydroxyphenyl)disulfide, bis(4-formyl-2-phenylthiophenyl)disulfide, bis(4-acetyl-2-nitrophenyl)disulfide, bis(4-acetyl-2-aminophenyl)disulfide, bis(4-acetyl-2-hydroxyphenyl)disulfide, bis(4-acetyl-2-phenylthiophenyl)disulfide, bis(4-chlorocarbonyl-2-nitrophenyl)disulfide, bis(4-chlorocarbonyl-2-aminophenyl)disulfide, bis(4-chlorocarbonyl-2-hydroxyphenyl)disulfide, bis(4-chlorocarbonyl-2-phenylthiophenyl)disulfide, bis(4-sulfo-2-nitrophenyl)disulfide, bis(4-sulfo-2-aminophenyl)disulfide, bis(4-sulfo-2-hydroxyphenyl)disulfide, bis(4-sulfo-2-phenylthiophenyl)disulfide, bis(4-methoxysulfonyl-2-nitrophenyl)disulfide, bis(4-methoxysulfonyl-2-aminophenyl)disulfide, bis(4-methoxysulfonyl-2-hydroxyphenyl)disulfide, bis(4-methoxysulfonyl-2-phenylthiophenyl)disulfide, bis(4-chlorosulfonyl-2-nitrophenyl)disulfide, bis(4-chlorosulfonyl-2-aminophenyl)disulfide, bis(4-chlorosulfonyl-2-hydroxyphenyl)disulfide, bis(4-chlorosulfonyl-2-phenylthiophenyl)disulfide, bis(4-sulfino-2-nitrophenyl)disulfide, bis(4-sulfino-2-aminophenyl)disulfide, bis(4-sulfino-2-hydroxyphenyl)disulfide, bis(4-sulfino-2-phenylthiophenyl)disulfide, bis(4-methylsulfinyl-2-nitrophenyl)disulfide, bis(4- methylsulfinyl-2-aminophenyl)disulfide, bis(4-methylsulfinyl-2-hydroxyphenyl)disulfide, bis(4-methylsulfinyl-2-phenylthiophenyl)disulfide, bis(4-carbamoyl-2-nitrophenyl)disulfide, bis(4-carbamoyl-2-aminophenyl)disulfide, bis(4-carbamoyl-2-hydroxyphenyl)disulfide, bis(4-carbamoyl-2-phenylthiophenyl)disulfide, bis(4-trichloromethyl-2-nitrophenyl)disulfide, bis(4-trichloromethyl-2-aminophenyl)disulfide, bis(4-trichloromethyl-2-hydroxyphenyl)disulfide, bis(4-trichloromethyl-2-phenylthiophenyl)disulfide, bis(4-cyano-2-nitrophenyl)disulfide, bis(4-cyano-2-aminophenyl)disulfide, bis(4-cyano-2-hydroxyphenyl)disulfide, bis(4-cyano-2-phenylthiophenyl)disulfide, bis(4-methoxy-2-nitrophenyl)disulfide, bis(4-methoxy-2-aminophenyl)disulfide, bis(4-methoxy-2-hydroxyphenyl)disulfide, and bis(4-methoxy-2-phenylthiophenyl)disulfide.

Still another example of the organic sulfur compound represented by the chemical formula (2) is a compound substituted with two or more types of substituents. Specific examples of the compound include bis(4-acetyl-2-chlorophenyl)disulfide, bis(4-acetyl-2-methylphenyl)disulfide, bis(4-acetyl-2-carboxyphenyl)disulfide, bis(4-acetyl-2-methoxycarbonylphenyl)disulfide, bis(4-acetyl-2-formylphenyl)disulfide, bis(4-acetyl-2-chlorocarbonylphenyl)disulfide, bis(4-acetyl-2-sulfophenyl)disulfide, bis(4-acetyl-2-methoxysulfonylphenyl)disulfide, bis(4-acetyl-2-chlorosulfonylphenyl)disulfide, bis(4-acetyl-2-sulfinophenyl)disulfide, bis(4-acetyl-2-methylsulfinylphenyl)disulfide, bis(4-acetyl-2-carbamoylphenyl)disulfide, bis(4-acetyl-2-trichloromethylphenyl)disulfide, bis(4-acetyl-2-cyanophenyl)disulfide, and bis(4-acetyl-2-methoxyphenyl)disulfide.

Examples of the organic sulfur compound represented by the chemical formula (3) include thiophenol sodium salt; thiophenol sodium salts substituted with halogen groups, such as 4-fluorothiophenol sodium salt, 2,5-difluorothiophenol sodium salt, 2,4,5-trifluorothiophenol sodium salt, 2,4,5,6-tetrafluorothiophenol sodium salt, pentafluorothiophenol sodium salt, 4-chlorothiophenol sodium salt, 2,5-dichlorothiophenol sodium salt, 2,4,5-trichlorothiophenol sodium salt, 2,4,5,6-tetrachlorothiophenol sodium salt, pentachlorothiophenol sodium salt, 4-bromothiophenol sodium salt, 2,5-dibromothiophenol sodium salt, 2,4,5-tribromothiophenol sodium salt, 2,4,5,6-tetrabromothiophenol sodium salt, pentabromothiophenol sodium salt, 4-iodothiophenol sodium salt, 2,5-diiodothiophenol sodium salt, 2,4,5-triiodothiophenol sodium salt, 2,4,5,6-tetraiodothiophenol sodium salt, and pentaiodothiophenol sodium salt; thiophenol sodium salts substituted with alkyl groups, such as 4-methylthiophenol sodium salt, 2,4,5-trimethylthiophenol sodium salt, pentamethylthiophenol sodium salt, 4-t-butylthiophenol sodium salt, 2,4,5-tri-t-butylthiophenol sodium salt, and penta(t-butyl)thiophenol sodium salt; thiophenol sodium salts substituted with carboxyl groups, such as 4-carboxythiophenol sodium salt, 2,4,6-tricarboxythiophenol sodium salt, and pentacarboxythiophenol sodium salt; thiophenol sodium salts substituted with alkoxycarbonyl groups, such as 4-methoxycarbonylthiophenol sodium salt, 2,4,6-trimethoxycarbonylthiophenol sodium salt, and pentamethoxycarbonylthiophenol sodium salt; thiophenol sodium salts substituted with formyl groups, such as 4-formylthiophenol sodium salt, 2,4,6-triformylthiophenol sodium salt, and pentaformylthiophenol sodium salt; thiophenol sodium salts substituted with acyl groups, such as 4-acetylthiophenol sodium salt, 2,4,6-triacetylthiophenol sodium salt, and pentaacetylthiophenol sodium salt; thiophenol sodium salts substituted with carbonyl halide groups, such as 4-chlorocarbonylthiophenol sodium salt, 2,4,6-tri(chlorocarbonyl)thiophenol sodium salt, and penta(chlorocarbonyl)thiophenol sodium salt; thiophenol sodium salts substituted with sulfo groups, such as 4-sulfothiophenol sodium salt, 2,4,6-trisulfothiophenol sodium salt, and pentasulfothiophenol sodium salt; thiophenol sodium salts substituted with alkoxysulfonyl groups, such as 4-methoxysulfonylthiophenol sodium salt, 2,4,6-trimethoxysulfonylthiophenol sodium salt, and pentamethoxysulfonylthiophenol sodium salt; thiophenol sodium salts substituted with sulfonyl halide groups, such as 4-chlorosulfonylthiophenol sodium salt, 2,4,6-tri(chlorosulfonyl)thiophenol sodium salt, and Penta(chlorosulfonyl)thiophenol sodium salt; thiophenol sodium salts substituted with sulfino groups, such as 4-sulfinothiophenol sodium salt, 2,4,6-trisulfinothiophenol sodium salt, and pentasulfinothiophenol sodium salt; thiophenol sodium salts substituted with alkylsulfinyl groups, such as 4-methylsulfinylthiophenol sodium salt, 2,4,6-tri(methylsulfinyl)thiophenol sodium salt, and penta(methylsulfinyl)thiophenol sodium salt; thiophenol sodium salts substituted with carbamoyl groups, such as 4-carbamoylthiophenol sodium salt, 2,4,6-tricarbamoylthiophenol sodium salt, and pentacarbamoylthiophenol sodium salt; thiophenol sodium salts substituted with alkyl halide groups, such as 4-trichloromethylthiophenol sodium salt, 2,4,6-tri(trichloromethyl)thiophenol sodium salt, and penta(trichloromethyl)thiophenol sodium salt; thiophenol sodium salts substituted with cyano groups, such as 4-cyanothiophenol sodium salt, 2,4,6-tricyanothiophenol sodium salt, and pentacyanothiophenol sodium salt; and thiophenol sodium salts substituted with alkoxy groups, such as 4-methoxythiophenol sodium salt, 2,4,6-trimethoxythiophenol sodium salt, and pentamethoxythiophenol sodium salt. Each of these thiophenol sodium salts is substituted with one type of substituent.

Another example of the organic sulfur compound represented by the chemical formula (3) is a compound substituted with at least one type of the above substituents and another substituent. Examples of the other substituent include a nitro group (—$NO_2$), an amino group (—$NH_2$), a hydroxyl group (—OH), and a phenylthio group (—SPh). Specific examples of the compound include 4-chloro-2-nitrothiophenol sodium salt, 4-chloro-2-aminothiophenol sodium salt, 4-chloro-2-hydroxythiophenol sodium salt, 4-chloro-2-phenylthiothiophenol sodium salt, 4-methyl-2-nitrothiophenol sodium salt, 4-methyl-2-aminothiophenol sodium salt, 4-methyl-2-hydroxythiophenol sodium salt, 4-methyl-2-phenylthiothiophenol sodium salt, 4-carboxy-2-nitrothiophenol sodium salt, 4-carboxy-2-aminothiophenol sodium salt, 4-carboxy-2-hydroxythiophenol sodium salt, 4-carboxy-2-phenylthiothiophenol sodium salt, 4-methoxycarbonyl-2-nitrothiophenol sodium salt, 4-methoxycarbonyl-2-aminothiophenol sodium salt, 4-methoxycarbonyl-2-hydroxythiophenol sodium salt, 4-methoxycarbonyl-2-phenylthiothiophenol sodium salt, 4-formyl-2-nitrothiophenol sodium salt, 4-formyl-2-aminothiophenol sodium salt, 4-formyl-2-hydroxythiophenol sodium salt, 4-formyl-2-phenylthiothiophenol sodium salt, 4-acetyl-2-nitrothiophenol sodium salt, 4-acetyl-2-aminothiophenol sodium salt, 4-acetyl-2-hydroxythiophenol sodium salt, 4-acetyl-2-phenylthiothiophenol sodium salt, 4-chlorocarbonyl-2-nitrothiophenol sodium salt, 4-chlorocarbonyl-2-aminothiophenol sodium salt, 4-chlorocarbonyl-2-hydroxythiophenol sodium salt, 4-chlorocarbonyl-2-phenylthiothiophenol sodium salt, 4-sulfo-2-nitrothiophenol sodium salt, 4-sulfo-2-aminothiophenol sodium salt, 4-sulfo-2-hydroxythiophenol sodium salt, 4-sulfo-2-phenylthiothiophenol sodium salt, 4-methoxysulfonyl-2-nitrothiophenol sodium salt, 4-methoxysulfonyl-2-aminothiophenol sodium salt, 4-methoxysulfonyl-2-hydroxythiophenol sodium salt, 4-methoxysulfonyl-2-phenylthiothiophenol sodium salt, 4-chlorosulfonyl-2-nitrothiophenol sodium salt, 4-chlorosulfonyl-2-aminothiophenol sodium salt, 4-chlorosulfonyl-2-hydroxythiophenol sodium salt, 4-chlorosulfonyl-2-phenylthiothiophenol sodium salt, 4-sulfino-2-nitrothiophenol sodium salt, 4-sulfino-2-aminothiophenol sodium salt, 4-sulfino-2-hydroxythiophenol sodium salt, 4-sulfino-2-phenylthiothiophenol sodium salt, 4-methylsulfinyl-2-nitrothiophenol sodium salt, 4-methylsulfinyl-2-aminothiophenol sodium salt, 4-methylsulfinyl-2-hydroxythiophenol sodium salt, 4-methylsulfinyl-2-phenylthiothiophenol sodium salt, 4-carbamoyl-2-nitrothiophenol sodium salt, 4-carbamoyl-2-aminothiophenol sodium salt, 4-carbamoyl-2-hydroxythiophenol sodium salt, 4-carbamoyl-2-phenylthiothiophenol sodium salt, 4-trichloromethyl-2-nitrothiophenol sodium salt, 4-trichloromethyl-2-aminothiophenol sodium salt, 4-trichloromethyl-2-hydroxythiophenol sodium salt, 4-trichloromethyl-2-phenylthiothiophenol sodium salt, 4-cyano-2-nitrothiophenol sodium salt, 4-cyano-2-aminothiophenol sodium salt, 4-cyano-2-hydroxythiophenol sodium salt, 4-cyano-2-phenylthiothiophenol sodium salt, 4-methoxy-2-nitrothiophenol sodium salt, 4-methoxy-2-aminothiophenol sodium salt, 4-methoxy-2-hydroxythiophenol sodium salt, and 4-methoxy-2-phenylthiothiophenol sodium salt.

Still another example of the organic sulfur compound represented by the chemical formula (3) is a compound substituted with two or more types of substituents. Specific examples of the compound include 4-acetyl-2-chlorothiophenol sodium salt, 4-acetyl-2-methylthiophenol sodium salt, 4-acetyl-2-carboxythiophenol sodium salt, 4-acetyl-2-methoxycarbonylthiophenol sodium salt, 4-acetyl-2-formylthiophenol sodium salt, 4-acetyl-2-chlorocarbonylthiophenol sodium salt, 4-acetyl-2-sulfothiophenol sodium salt, 4-acetyl-2-methoxysulfonylthiophenol sodium salt, 4-acetyl-2-chlorosulfonylthiophenol sodium salt, 4-acetyl-2-sulfinothiophenol sodium salt, 4-acetyl-2-methylsulfinylthiophenol sodium salt, 4-acetyl-2-carbamoylthiophenol sodium salt, 4-acetyl-2-trichloromethylthiophenol sodium salt, 4-acetyl-2-cyanothiophenol sodium salt, and 4-acetyl-2-methoxythiophenol sodium salt. Examples of the monovalent metal represented by M1 in the chemical formula (3) include sodium, lithium, potassium, copper (I), and silver (I).

Examples of the organic sulfur compound represented by the chemical formula (4) include thiophenol zinc salt; thiophenol zinc salts substituted with halogen groups, such as 4-fluorothiophenol zinc salt, 2,5-difluorothiophenol zinc salt, 2,4,5-trifluorothiophenol zinc salt, 2,4,5,6-tetrafluorothiophenol zinc salt, pentafluorothiophenol zinc salt, 4-chlorothiophenol zinc salt, 2,5-dichlorothiophenol zinc salt, 2,4,5-trichlorothiophenol zinc salt, 2,4,5,6-tetrachlorothiophenol zinc salt, pentachlorothiophenol zinc salt, 4-bromothiophenol zinc salt, 2,5-dibromothiophenol zinc salt, 2,4,5-tribromothiophenol zinc salt, 2,4,5,6-tetrabromothiophenol zinc salt, pentabromothiophenol zinc salt, 4-iodothiophenol zinc salt, 2,5-diiodothiophenol zinc salt, 2,4,5-triiodothiophenol zinc salt, 2,4,5,6-tetraiodothiophenol zinc salt, and pentaiodothiophenol zinc salt; thiophenol zinc salts substituted with alkyl groups, such as 4-methylthiophenol zinc salt, 2,4,5-trimethylthiophenol zinc salt, pentamethylthiophenol zinc salt, 4-t-butylthiophenol zinc salt, 2,4,5-tri-t-butylthiophenol zinc salt, and penta-t-butylthiophenol zinc salt; thiophenol zinc salts substituted with carboxyl groups, such as 4-carboxythiophenol zinc salt, 2,4,6-tricarboxythiophenol zinc salt, and pentacarboxythiophenol zinc salt; thiophenol zinc salts substituted with alkoxycarbonyl groups, such as 4-methoxycarbonylthiophenol zinc salt, 2,4,6-trimethoxycarbonylthiophenol zinc salt, and pentamethoxycarbonylthiophenol zinc salt; thiophenol zinc salts substituted with formyl groups, such as 4-formylthiophenol zinc salt, 2,4,6-triformylthiophenol zinc salt, and pentaformylthiophenol zinc salt; thiophenol zinc salts substituted with acyl groups, such as 4-acetylthiophenol zinc salt, 2,4,6-triacetylthiophenol zinc salt, and pentaacetylthiophenol zinc salt; thiophenol zinc salts substituted with carbonyl halide groups, such as 4-chlorocarbonylthiophenol zinc salt, 2,4,6-tri(chlorocarbonyl)thiophenol zinc salt, and penta(chlorocarbonyl)thiophenol zinc salt; thiophenol zinc salts substituted with sulfo groups, such as 4-sulfothiophenol zinc salt, 2,4,6-trisulfothiophenol zinc salt, and pentasulfothiophenol zinc salt; thiophenol zinc salts substituted with alkoxysulfonyl groups, such as 4-methoxysulfonylthiophenol zinc salt, 2,4,6-trimethoxysulfonylthiophenol zinc salt, and pentamethoxysulfonylthiophenol zinc salt; thiophenol zinc salts substituted with sulfonyl halide groups, such as 4-chlorosulfonylthiophenol zinc salt, 2,4,6-tri(chlorosulfonyl)thiophenol zinc salt, and penta(chlorosulfonyl)thiophenol zinc salt; thiophenol zinc salts substituted with sulfino groups, such as 4-sulfinothiophenol zinc salt, 2,4,6-trisulfinothiophenol zinc salt, and pentasulfinothiophenol zinc salt; thiophenol zinc salts substituted with alkylsulfinyl groups, such as 4-methylsulfinylthiophenol zinc salt, 2,4,6-tri(methylsulfinyl)thiophenol zinc salt, and penta(methylsulfinyl)thiophenol zinc salt; thiophenol zinc salts substituted with carbamoyl groups, such as 4-carbamoylthiophenol zinc salt, 2,4,6-tricarbamoylthiophenol zinc salt, and pentacarbamoylthiophenol zinc salt; thiophenol zinc salts substituted with alkyl halide groups, such as 4-trichloromethylthiophenol zinc salt, 2,4,6-tri(trichloromethyl)thiophenol zinc salt, and penta(trichloromethyl)thiophenol zinc salt; thiophenol zinc salts substituted with cyano groups, such as 4-cyanothiophenol zinc salt, 2,4,6-tricyanothiophenol zinc salt, and pentacyanothiophenol zinc salt; and thiophenol zinc salts substituted with alkoxy groups, such as 4-methoxythiophenol zinc salt, 2,4,6-trimethoxythiophenol zinc salt, and pentamethoxythiophenol zinc salt. Each of these thiophenol zinc salts is substituted with one type of substituent.

Another example of the organic sulfur compound represented by the chemical formula (4) is a compound substituted with at least one type of the above substituents and another substituent. Examples of the other substituent include a nitro group (—$NO_2$), an amino group (—$NH_2$), a hydroxyl group (—OH), and a phenylthio group (—SPh). Specific examples of the compound include 4-chloro-2-nitrothiophenol zinc salt, 4-chloro-2-aminothiophenol zinc salt, 4-chloro-2-hydroxythiophenol zinc salt, 4-chloro-2-phenylthiothiophenol zinc salt, 4-methyl-2-nitrothiophenol zinc salt, 4-methyl-2-aminothiophenol zinc salt, 4-methyl-2-hydroxythiophenol zinc salt, 4-methyl-2-phenylthiothiophenol zinc salt, 4-carboxy-2-nitrothiophenol zinc salt, 4-carboxy-2-aminothiophenol zinc salt, 4-carboxy-2-hydroxythiophenol zinc salt, 4-carboxy-2-phenylthiothiophenol zinc salt, 4-methoxycarbonyl-2-nitrothiophenol zinc salt, 4-methoxycarbonyl-2-aminothiophenol zinc salt, 4-methoxycarbonyl-2-hydroxythiophenol zinc salt, 4-methoxycarbonyl-2-phenylthiothiophenol zinc salt, 4-formyl-2-nitrothiophenol zinc salt, 4-formyl-2-aminothiophenol zinc salt, 4-formyl-2-hydroxythiophenol zinc salt, 4-formyl-2-phenylthiothiophenol zinc salt, 4-acetyl-2-nitrothiophenol zinc salt, 4-acetyl-2- aminothiophenol zinc salt, 4-acetyl-2-hydroxythiophenol zinc salt, 4-acetyl-2-phenylthiothiophenol zinc salt, 4-chlorocarbonyl-2-nitrothiophenol zinc salt, 4-chlorocarbonyl-2-aminothiophenol zinc salt, 4-chlorocarbonyl-2-hydroxythiophenol zinc salt, 4-chlorocarbonyl-2-phenylthiothiophenol zinc salt, 4-sulfo-2-nitrothiophenol zinc salt, 4-sulfo-2-aminothiophenol zinc salt, 4-sulfo-2-hydroxythiophenol zinc salt, 4-sulfo-2-phenylthiothiophenol zinc salt, 4-methoxysulfonyl-2-nitrothiophenol zinc salt, 4-methoxysulfonyl-2-aminothiophenol zinc salt, 4-methoxysulfonyl-2-hydroxythiophenol zinc salt, 4-methoxysulfonyl-2-phenylthiothiophenol zinc salt, 4-chlorosulfonyl-2-nitrothiophenol zinc salt, 4-chlorosulfonyl-2-aminothiophenol zinc salt, 4-chlorosulfonyl-2-hydroxythiophenol zinc salt, 4-chlorosulfonyl-2-phenylthiothiophenol zinc salt, 4-sulfino-2-nitrothiophenol zinc salt, 4-sulfino-2-aminothiophenol zinc salt, 4-sulfino-2-hydroxythiophenol zinc salt, 4-sulfino-2-phenylthiothiophenol zinc salt, 4-methylsulfinyl-2-nitrothiophenol zinc salt, 4-methylsulfinyl-2-aminothiophenol zinc salt, 4-methylsulfinyl-2-hydroxythiophenol zinc salt, 4-methylsulfinyl-2-phenylthiothiophenol zinc salt, 4-carbamoyl-2-nitrothiophenol zinc salt, 4-carbamoyl-2-aminothiophenol zinc salt, 4-carbamoyl-2-hydroxythiophenol zinc salt, 4-carbamoyl-2-phenylthiothiophenol zinc salt, 4-trichloromethyl-2-nitrothiophenol zinc salt, 4-trichloromethyl-2-aminothiophenol zinc salt, 4-trichloromethyl-2-hydroxythiophenol zinc salt, 4-trichloromethyl-2-phenylthiothiophenol zinc salt, 4-cyano-2-nitrothiophenol zinc salt, 4-cyano-2-aminothiophenol zinc salt, 4-cyano-2-hydroxythiophenol zinc salt, 4-cyano-2-phenylthiothiophenol zinc salt, 4-methoxy-2-nitrothiophenol zinc salt, 4-methoxy-2-aminothiophenol zinc salt, 4-methoxy-2-hydroxythiophenol zinc salt, and 4-methoxy-2-phenylthiothiophenol zinc salt.

Still another example of the organic sulfur compound represented by the chemical formula (4) is a compound substituted with two or more types of substituents. Specific examples of the compound include 4-acetyl-2-chlorothiophenol zinc salt, 4-acetyl-2-methylthiophenol zinc salt, 4-acetyl-2-carboxythiophenol zinc salt, 4-acetyl-2-methoxycarbonylthiophenol zinc salt, 4-acetyl-2-formylthiophenol zinc salt, 4-acetyl-2-chlorocarbonylthiophenol zinc salt, 4-acetyl-2-sulfothiophenol zinc salt, 4-acetyl-2-methoxysulfonylthiophenol zinc salt, 4-acetyl-2-chlorosulfonylthiophenol zinc salt, 4-acetyl-2-sulfinothiophenol zinc salt, 4-acetyl-2-methylsulfinylthiophenol zinc salt, 4-acetyl-2-carbamoylthiophenol zinc salt, 4-acetyl-2-trichloromethylthiophenol zinc salt, 4-acetyl-2-cyanothiophenol zinc salt, and 4-acetyl-2-methoxythiophenol zinc salt. Examples of the bivalent metal represented by M2 in the chemical formula (4) include zinc, magnesium, calcium, strontium, barium, titanium (II), manganese (II), iron (II), cobalt (II), nickel (II), zirconium (II), and tin (II).

Examples of naphthalenethiols include 2-naphthalenethiol, 1-naphthalenethiol, 2-chloro-1-naphthalenethiol, 2-bromo-1-naphthalenethiol, 2-fluoro-1-naphthalenethiol, 2-cyano-1-naphthalenethiol, 2-acetyl-1-naphthalenethiol, 1-chloro-2-naphthalenethiol, 1-bromo-2-naphthalenethiol, 1-fluoro-2-naphthalenethiol, 1-cyano-2-naphthalenethiol, 1-acetyl-2-naphthalenethiol, and metal salts thereof. 1-naphthalenethiol, 2-naphthalenethiol, and zinc salts thereof are preferred.

Examples of sulfenamide type organic sulfur compounds include N-cyclohexyl-2-benzothiazole sulfenamide, N-oxydiethylene-2-benzothiazole sulfenamide, and N-t-butyl-2-benzothiazole sulfenamide. Examples of thiuram type organic sulfur compounds include tetramethylthiuram monosulfide, tetramethylthiuram disulfide, tetraethylthiuram disulfide, tetrabutylthiuram disulfide, and dipentamethylenethiuram tetrasulfide. Examples of dithiocarbamates include zinc dimethyldithiocarbamate, zinc diethyldithiocarbamate, zinc dibutyldithiocarbamate, zinc ethylphenyldithiocarbamate, sodium dimethyldithiocarbamate, sodium diethyldithiocarbamate, copper (II) dimethyldithiocarbamate, iron (III) dimethyldithiocarbamate, selenium diethyldithiocarbamate, and tellurium diethyldithiocarbamate. Examples of thiazole type organic sulfur compounds include 2-mercaptobenzothiazole (MBT); dibenzothiazyl disulfide (MBTS); a sodium salt, a zinc salt, a copper salt, or a cyclohexylamine salt of 2-mercaptobenzothiazole; 2-(2,4-dinitrophenyl)mercaptobenzothiazole; and 2-(2,6-diethyl-4-morpholinothio)benzothiazole.

The organic sulfur compound (e) is particularly preferably 2-naphthalenethiol. From the rubber composition that includes 2-naphthalenethiol, the core 4 having an outer-hard/inner-soft structure is easily obtained.

From the standpoint that the outer-hard/inner-soft structure of the core 4 can be achieved, the amount of the organic sulfur compound (e) is preferably equal to or greater than 0.05 parts by weight, more preferably equal to or greater than 0.1 parts by weight, and particularly preferably equal to or greater than 0.2 parts by weight, per 100 parts by weight of the base rubber. In light of resilience performance, the amount is preferably equal to or less than 5.0 parts by weight, more preferably equal to or less than 3.0 parts by weight, and particularly preferably equal to or less than 1.0 parts by weight, per 100 parts by weight of the base rubber.

For the purpose of adjusting specific gravity and the like, a filler may be included in the core 4. Examples of suitable fillers include zinc oxide, barium sulfate, calcium carbonate, and magnesium carbonate. The amount of the filler is determined as appropriate so that the intended specific gravity of the core 4 is accomplished. A particularly preferable filler is zinc oxide. Zinc oxide serves not only as a specific gravity adjuster but also as a crosslinking activator.

According to need, an anti-aging agent, a coloring agent, a plasticizer, a dispersant, sulfur, a vulcanization accelerator, and the like are added to the rubber composition of the core 4. Crosslinked rubber powder or synthetic resin powder may also be dispersed in the rubber composition.

The hardness H(0) at the central point of the core 4 is preferably equal to or greater than 40 but equal to or less than 70. The golf ball 2 having a hardness H(0) of 40 or greater has excellent resilience performance. In this respect, the hardness H(0) is more preferably equal to or greater than 45 and particularly preferably equal to or greater than 50. The core 4 having a hardness H(0) of 70 or less can achieve an outer-hard/inner-soft structure. In the golf ball 2 that includes the core 4, spin can be suppressed. In this respect, the hardness H(0) is more preferably equal to or less than 68 and particularly preferably equal to or less than 65.

The hardness H(100) at the surface of the core 4 is preferably equal to or greater than 78 but equal to or less than 96. The core 4 having a hardness H(100) of 78 or greater can achieve an outer-hard/inner-soft structure. In the golf ball 2 that includes the core 4, spin can be suppressed. In this respect, the hardness H(100) is more preferably equal to or greater than 80 and particularly preferably equal to or greater than 82. The golf ball 2 having a hardness H(100) of 96 or less has excellent durability. In this respect, the hardness H(100) is more preferably equal to or less than 94 and particularly preferably equal to or less than 92.

The core 4 has a diameter of preferably 38.0 mm or greater but 42.0 mm or less. The core 4 having a diameter of 38.0 mm or greater can achieve excellent resilience performance of the golf ball 2. The core 4 having a diameter of 38.0 mm or greater can achieve an outer-hard/inner-soft structure of the golf ball 2. In this respect, the diameter is more preferably equal to or greater than 39.0 mm and particularly preferably equal to or greater than 39.5 mm. In the golf ball 2 that includes the core 4 having a diameter of 42.0 mm or less, the mid layer 6 and the cover 10 can have sufficient thicknesses. The golf ball 2 that includes the mid layer 6 and the cover 10 having large thicknesses has excellent durability. In this respect, the diameter is more preferably equal to or less than 41 mm and particularly preferably equal to or less than 40 mm. The core 4 may have two or more layers.

For the mid layer 6, a resin composition is suitably used. Examples of the base polymer of the resin composition include ionomer resins, polystyrenes, polyesters, polyamides, and polyolefins.

Particularly preferable base polymers are ionomer resins. The golf ball 2 that includes the mid layer 6 including an ionomer resin has excellent resilience performance. An ionomer resin and another resin may be used in combination for the mid layer 6. In this case, the principal component of the base polymer is preferably the ionomer resin. Specifically, the proportion of the ionomer resin to the entire base polymer is preferably equal to or greater than 50% by weight, more preferably equal to or greater than 60% by weight, and particularly preferably equal to or greater than 70% by weight.

Examples of preferable ionomer resins include binary copolymers formed with an α-olefin and an α,β-unsaturated carboxylic acid having 3 to 8 carbon atoms. A preferable binary copolymer includes 80% by weight or more and 90% by weight or less of an α-olefin, and 10% by weight or more and 20% by weight or less of an α,β-unsaturated carboxylic acid. The binary copolymer has excellent resilience performance. Examples of other preferable ionomer resins include ternary copolymers formed with: an α-olefin; an α,β-unsaturated carboxylic acid having 3 to 8 carbon atoms; and an α,β-unsaturated carboxylate ester having 2 to 22 carbon atoms. A preferable ternary copolymer includes 70% by weight or more and 85% by weight or less of an α-olefin, 5% by weight or more and 30% by weight or less of an α,β-unsaturated carboxylic acid, and 1% by weight or more and 25% by weight or less of an α,β-unsaturated carboxylate ester. The ternary copolymer has excellent resilience performance. For the binary copolymers and the ternary copolymers, preferable α-olefins are ethylene and propylene, while preferable α,β-unsaturated carboxylic acids are acrylic acid and methacrylic acid. A particularly preferable ionomer resin is a copolymer formed with ethylene and acrylic acid or methacrylic acid.

In the binary copolymers and the ternary copolymers, some of the carboxyl groups are neutralized with metal ions. Examples of metal ions for use in neutralization include sodium ion, potassium ion, lithium ion, zinc ion, calcium ion, magnesium ion, aluminum ion, and neodymium ion. The neutralization may be carried out with two or more types of metal ions. Particularly suitable metal ions in light of resilience performance and durability of the golf ball 2 are sodium ion, zinc ion, lithium ion, and magnesium ion.

Specific examples of ionomer resins include trade names "Himilan 1555", "Himilan 1557", "Himilan 1605", "Himilan 1706", "Himilan 1707", "Himilan 1856", "Himilan 1855", "Himilan AM7311", "Himilan AM7315", "Himilan AM7317", "Himilan AM7318", "Himilan AM7329", "Himilan MK7320", and "Himilan MK7329", manufactured by Du Pont-MITSUI POLYCHEMICALS Co., Ltd.; trade names "Surlyn 6120", "Surlyn 6910", "Surlyn 7930", "Surlyn 7940", "Surlyn 8140", "Surlyn 8150", "Surlyn 8940", "Surlyn 8945", "Surlyn 9120", "Surlyn 9150", "Surlyn 9910", "Surlyn 9945", "Surlyn AD8546", "HPF1000", and "HPF2000", manufactured by E.I. du Pont de Nemours and Company; and trade names "IOTEK 7010", "IOTEK 7030", "IOTEK 7510", "IOTEK 7520", "IOTEK 8000", and "IOTEK 8030", manufactured by ExxonMobil Chemical Corporation.

Two or more ionomer resins may be used in combination for the mid layer 6. An ionomer resin neutralized with a monovalent metal ion, and an ionomer resin neutralized with a bivalent metal ion may be used in combination.

A preferable resin that can be used in combination with an ionomer resin is a styrene block-containing thermoplastic elastomer. The styrene block-containing thermoplastic elastomer has excellent compatibility with ionomer resins. A resin composition including the styrene block-containing thermoplastic elastomer has excellent fluidity.

The styrene block-containing thermoplastic elastomer includes a polystyrene block as a hard segment, and a soft segment. A typical soft segment is a diene block. Examples of diene compounds include butadiene, isoprene, 1,3-pentadiene, and 2,3-dimethyl-1,3-butadiene. Butadiene and isoprene are preferred. Two or more compounds may be used in combination.

Examples of styrene block-containing thermoplastic elastomers include styrene-butadiene-styrene block copolymers (SBS), styrene-isoprene-styrene block copolymers (SIS), styrene-isoprene-butadiene-styrene block copolymers (SIBS), hydrogenated SBS, hydrogenated SIS, and hydrogenated SIBS. Examples of hydrogenated SBS include styrene-ethylene-butylene-styrene block copolymers (SEBS). Examples of hydrogenated SIS include styrene-ethylene-propylene-styrene block copolymers (SEPS). Examples of hydrogenated SIBS include styrene-ethylene-ethylene-propylene-styrene block copolymers (SEEPS).

In light of resilience performance of the golf ball 2, the content of the styrene component in the styrene block-containing thermoplastic elastomer is preferably equal to or greater than 10% by weight, more preferably equal to or greater than 12% by weight, and particularly preferably equal to or greater than 15% by weight. In light of feel at impact of the golf ball 2, the content is preferably equal to or less than 50% by weight, more preferably equal to or less than 47% by weight, and particularly preferably equal to or less than 45% by weight.

In the present invention, styrene block-containing thermoplastic elastomers include alloys of olefin and one or more members selected from the group consisting of SBS, SIS, SIBS, SEBS, SEPS, SEEPS, and hydrogenated products thereof. The olefin component in the alloy is presumed to contribute to improvement of compatibility with ionomer resins. Use of this alloy improves the resilience performance of the golf ball 2. An olefin having 2 to 10 carbon atoms is preferably used. Examples of suitable olefins include ethylene, propylene, butene, and pentene. Ethylene and propylene are particularly preferred.

Specific examples of polymer alloys include trade names "RabalonT3221C", "RabalonT3339C", "RabalonSJ4400N", "Rabalon SJ5400N", "Rabalon SJ6400N", "Rabalon SJ7400N", "Rabalon SJ8400N", "Rabalon SJ9400N", and "Rabalon SR04", manufactured by Mitsubishi Chemical Corporation. Other specific examples of styrene block-containing thermoplastic elastomers include trade name "Epofriend A1010" manufactured by Daicel Chemical Industries, Ltd., and trade name "Septon HG-252" manufactured by Kuraray Co., Ltd.

The mid layer 6 may include a highly elastic resin as a base polymer. The highly elastic resin contributes to high rigidity of the mid layer 6. Examples of the highly elastic resin include polyamides.

According to need, a coloring agent such as titanium dioxide, a filler such as barium sulfate, a dispersant, an antioxidant, an ultraviolet absorber, a light stabilizer, a fluorescent material, a fluorescent brightener, and the like are included in the resin composition of the mid layer 6 in an adequate amount.

From the standpoint that an outer-hard/inner-soft structure can be achieved in the sphere consisting of the core 4 and the mid layer 6, the mid layer 6 has a hardness Hm of preferably 55 or greater and particularly preferably 60 or greater. In light of feel at impact of the golf ball 2, the hardness Hm is preferably equal to or less than 70 and particularly preferably equal to or less than 68. The hardness Hm is measured according to the standards of "ASTM-D 2240-68" with a Shore D type hardness scale mounted to an automated rubber hardness measurement machine (trade name "21", manufactured by Kobunshi Keiki Co., Ltd.). For the measurement, a slab that is formed by hot press and that has a thickness of about 2 mm is used. A slab kept at 23° C. for two weeks is used for the measurement. At the measurement, three slabs are stacked. A slab formed from the same resin composition as the resin composition of the mid layer 6 is used.

The mid layer 6 has a thickness of preferably 0.5 mm or greater but 1.6 mm or less. In the sphere that includes the mid layer 6 having a thickness of 0.5 mm or greater, the spin suppression effect provided by the outer-hard/inner-soft structure is great. In this respect, the thickness is particularly preferably equal to or greater than 0.7 mm. The golf ball 2 that includes the mid layer 6 having a thickness of 1.6 mm or less can include a large core 4. The large core 4 can contribute to the resilience performance of the golf ball 2. In this respect, the thickness is particularly preferably equal to or less than 1.2 mm. The mid layer 6 may be composed of two or more layers. In this case, the total thickness of all the layers is set within the above range.

For forming the mid layer 6, known methods such as injection molding, compression molding, and the like can be used.

A resin composition is suitably used for the cover 10. A preferable base polymer of the resin composition is a polyurethane. The polyurethane is flexible. When the golf ball 2 that includes the cover 10 formed from the resin composition that includes the polyurethane is hit with a short iron, the spin rate is high. The cover 10 formed from this resin composition contributes to controllability upon a shot with a short iron. The polyurethane also contributes to the scuff resistance of the cover 10. Further, the polyurethane can contribute to excellent feel at impact when the golf ball 2 is hit with a putter or a short iron.

In light of ease of forming the cover 10, a preferable base polymer is a thermoplastic polyurethane elastomer. The thermoplastic polyurethane elastomer includes a polyurethane component as a hard segment, and a polyester component or a polyether component as a soft segment. Examples of isocyanates for the polyurethane component include alicyclic diisocyanates, aromatic diisocyanates, and aliphatic diisocyanates. Two or more diisocyanates may be used in combination.

Examples of alicyclic diisocyanates include 4,4'-dicyclohexylmethane diisocyanate ($H_{12}MDI$), 1,3-bis(isocyanatomethyl)cyclohexane ($H_6XDI$), isophorone diisocyanate (IPDI), and trans-1,4-cyclohexane diisocyanate (CHDI). In light of versatility and processability, $H_{12}MDI$ is preferred.

Examples of aromatic diisocyanates include 4,4'-diphenylmethane diisocyanate (MDI) and toluene diisocyanate (TDI). Examples of aliphatic diisocyanates include hexamethylene diisocyanate (HDI).

Particularly, alicyclic diisocyanates are preferred. Since an alicyclic diisocyanate does not have any double bond in the main chain, the alicyclic diisocyanate suppresses yellowing of the cover 10. In addition, since an alicyclic diisocyanate has excellent strength, the alicyclic diisocyanate suppresses a scuff on the cover 10.

Specific examples of thermoplastic polyurethanes include trade names "ElastollanNY80A", "ElastollanNY82A", "Elastollan NY84A", "Elastollan NY85A", "Elastollan NY88A", "Elastollan NY90A", "ElastollanNY97A", "Elastollan NY585", and "Elastollan XKP016N", manufactured by BASF Japan Ltd.; and trade names "RESAMINE P4585LS" and "RESAMINE PS62490", manufactured by Dainichiseika Color & Chemicals Mfg. Co., Ltd. From the standpoint that a low hardness of the cover 10 can be achieved, "Elastollan NY80A", "Elastollan NY82A", "Elastollan NY84A", "Elastollan NY85A", and "Elastollan NY90A" are particularly preferred.

A thermoplastic polyurethane elastomer and another resin may be used in combination. Examples of the resin that can be used in combination include thermoplastic polyester elastomers, thermoplastic polyamide elastomers, thermoplastic polyolefin elastomers, styrene block-containing thermoplastic elastomers, and ionomer resins. When a thermoplastic polyurethane elastomer and another resin are used in combination, the thermoplastic polyurethane elastomer is included as the principal component of the base polymer, in light of spin performance and scuff resistance. The proportion of the thermoplastic polyurethane elastomer to the entire base polymer is preferably equal to or greater than 50% by weight, more preferably equal to or greater than 70% by weight, and particularly preferably equal to or greater than 85% by weight.

According to need, a coloring agent such as titanium dioxide and a fluorescent pigment, a filler such as barium sulfate, a dispersant, an antioxidant, an ultraviolet absorber, a light stabilizer, a fluorescent material, a fluorescent brightener, and the like are included in the cover 10 in an adequate amount.

The cover 10 has a Shore D hardness Hc of preferably 48 or less. The golf ball 2 that includes the cover 10 having a hardness Hc of 48 or less has excellent controllability. In this respect, the hardness Hc is more preferably equal to or less than 40 and particularly preferably equal to or less than 32. In light of flight distance upon a shot with a driver, the hardness Hc is preferably equal to or greater than 10. The hardness Hc is measured by the same measurement method as that for the hardness Hm.

The Shore D hardness Hm of the mid layer 6 and the Shore D hardness Hc of the cover 10 satisfy the relation of the following mathematical formula.

$$Hm > Hc$$

When the golf ball 2 is hit with a driver, the sphere consisting of the core 4 and the mid layer 6 becomes significantly distorted since the head speed is high. Since this sphere has an outer-hard/inner-soft structure, the spin rate is suppressed. The hardness of the core 4 linearly changes. Thus, the golf ball 2 is launched at a high speed due to deformation and restoration of the core 4. The suppression of the spin rate and the high launch speed achieve a large flight distance. When the golf ball 2 is hit with a short iron, this sphere becomes less distorted since the head speed is low. When the golf ball 2 is hit with a short iron, the behavior of the golf ball 2 mainly depends on the cover 10. Since the cover 10 including the polyurethane is flexible, a slip between the golf ball 2 and a clubface is suppressed. Due to the suppression of the slip, a high spin rate is obtained. The high spin rate achieves excellent controllability. In the golf ball 2, both desired flight performance upon a shot with a driver and desired controllability upon a shot with a short iron are achieved.

When the golf ball 2 is hit, the cover 10 including the polyurethane absorbs the shock. This absorption achieves soft feel at impact Particularly, when the golf ball 2 is hit with a short iron or a putter, the cover 10 achieves excellent feel at impact.

In light of achievement of both desired flight performance and desired controllability, the difference (Hm-Hc) between the hardness Hm and the hardness Hc is preferably equal to or greater than 18, more preferably equal to or greater than 29, and particularly preferably equal to or greater than 30. The difference (Hm−Hc) is preferably equal to or less than 70.

In light of flight performance upon a shot with a driver, the cover 10 has a thickness of preferably 0.8 mm or less, more preferably 0.6 mm or less, and particularly preferably 0.4 mm or less. In light of controllability upon a shot with a short iron, the thickness is preferably equal to or greater than 0.10 mm and particularly preferably equal to or greater than 0.15 mm.

For forming the cover 10, known methods such as injection molding, compression molding, and the like can be used. When forming the cover 10, the dimples 12 are formed by pimples formed on the cavity face of a mold.

The reinforcing layer 8 is positioned between the mid layer 6 and the cover 10. The reinforcing layer 8 firmly adheres to the mid layer 6 and also to the cover 10. The reinforcing layer 8 suppresses separation of the cover 10 from the mid layer 6. As described above, the cover 10 of the golf ball 2 is thin. When the golf ball 2 is hit by the edge of a clubface, a wrinkle is likely to occur. The reinforcing layer 8 suppresses occurrence of a wrinkle.

As the base polymer of the reinforcing layer 8, a two-component curing type thermosetting resin is suitably used. Specific examples of two-component curing type thermosetting resins include epoxy resins, urethane resins, acrylic resins, polyester resins, and cellulose resins. In light of strength and durability of the reinforcing layer 8, two-component curing type epoxy resins and two-component curing type urethane resins are preferred.

A two-component curing type epoxy resin is obtained by curing an epoxy resin with a polyamide type curing agent. Examples of epoxy resins used in two-component curing type epoxy resins include bisphenol A type epoxy resins, bisphenol F type epoxy resins, and bisphenol AD type epoxy resins. A bisphenol A type epoxy resin is obtained by a reaction of bisphenol A and an epoxy group-containing compound such as epichlorohydrin or the like. A bisphenol F type epoxy resin is obtained by a reaction of bisphenol F and an epoxy group-containing compound. A bisphenol AD type epoxy resin is obtained by a reaction of bisphenol AD and an epoxy group-containing compound. In light of balance among flexibility, chemical resistance, heat resistance, and toughness, bisphenol A type epoxy resins are preferred.

The polyamide type curing agent has a plurality of amino groups and one or more amide groups. The amino groups can react with epoxy groups. Specific examples of the polyamide type curing agent include polyamide amine curing agents and modified products thereof. A polyamide amine curing agent is obtained by a condensation reaction of a polymerized fatty acid and a polyamine. A typical polymerized fatty acid is obtained by heating and combining natural fatty acids including a large amount of unsaturated fatty acids, such as linoleic acid, linolenic acid, and the like, in the presence of a catalyst. Specific examples of unsaturated fatty acids include tall oil, soybean oil, linseed oil, and fish oil. A hydrogenated polymerized fatty acid having a dimer content of 90% by weight or greater and a trimer content of 10% by weight or less is preferred. Examples of preferable polyamines include polyethylene diamines, polyoxyalkylene diamines, and derivatives thereof.

In a mixture of an epoxy resin and a polyamide type curing agent, the ratio of the epoxy equivalent of the epoxy resin to the amine active hydrogen equivalent of the polyamide type curing agent is preferably equal to or greater than 1.0/1.4 but equal to or less than 1.0/1.0.

A two-component curing type urethane resin is obtained by a reaction of a base material and a curing agent. A two-component curing type urethane resin obtained by a reaction of a base material containing a polyol component and a curing agent containing a polyisocyanate or a derivative thereof, and a two-component curing type urethane resin obtained by a reaction of a base material containing an isocyanate group-terminated urethane prepolymer and a curing agent having active hydrogen, can be used. Particularly, a two-component curing type urethane resin obtained by a reaction of a base material containing a polyol component and a curing agent containing a polyisocyanate or a derivative thereof, is preferred.

As the polyol component of the base material, a urethane polyol is preferably used. The urethane polyol has a urethane bond and at least two or more hydroxyl groups. Preferably, the urethane polyol has hydroxyl groups at its ends. The urethane polyol can be obtained by causing a reaction of a polyol and a polyisocyanate at such a ratio that the hydroxyl groups of the polyol component are excessive in mole ratio with respect to the isocyanate groups of the polyisocyanate.

The polyol used for producing the urethane polyol has a plurality of hydroxyl groups. Polyols having a weight average molecular weight of 50 or greater but 2000 or less are preferred, and polyols having a weight average molecular weight of 100 or greater but 1000 or less are particularly preferred. Examples of low-molecular-weight polyols include diols and triols. Specific examples of diols include ethylene glycol, diethylene glycol, triethylene glycol, 1,3-butanediol, 1,4-butanediol, neopentyl glycol, and 1,6-hexanediol. Specific examples of triols include trimethylol propane and hexanetriol. Examples of high-molecular-weight polyols include polyether polyols such as polyoxyethylene glycol (PEG), polyoxypropylene glycol (PPG), and polyoxytetramethylene glycol (PTMG); condensed polyester polyols such as polyethylene adipate (PEA), polybutylene adipate (PBA), and polyhexamethylene adipate (PHMA); lactone polyester polyols such as poly-$\epsilon$-caprolactone (PCL); polycarbonate polyols such as polyhexamethylene carbonate; and acrylic polyols. Two or more polyols may be used in combination.

The polyisocyanate used for producing the urethane polyol has a plurality of isocyanate groups. Specific examples of the polyisocyanate include aromatic polyisocyanates such as 2,4-toluene diisocyanate, 2,6-toluene diisocyanate, a mixture (TDI) of 2,4-toluene diisocyanate and 2,6-toluene diisocyanate, 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), and paraphenylene diisocyanate (PPDI); alicyclic polyisocyanates such as 4,4'-dicyclohexylmethane diisocyanate ($H_{12}MDI$), hydrogenated xylylene diisocyanate ($H_6XDI$), and isophorone diisocyanate (IPDI);

and aliphatic polyisocyanates such as hexamethylene diisocyanate (HDI). Two or more of these polyisocyanates may be used in combination. In light of weather resistance, TMXDI, XDI, HDI, $H_6$XDI, IPDI, and $H_{12}$MDI are preferred.

In the reaction of the polyol and the polyisocyanate for producing the urethane polyol, a known catalyst can be used. A typical catalyst is dibutyl tin dilaurate.

In light of strength of the reinforcing layer 8, the proportion of the urethane bonds included in the urethane polyol is preferably equal to or greater than 0.1 mmol/g. In light of followability of the reinforcing layer 8 to the cover 10, the proportion of the urethane bonds included in the urethane polyol is preferably equal to or less than 5 mmol/g. The proportion of the urethane bonds can be adjusted by adjusting the molecular weight of the polyol, which is the material for the urethane polyol, and adjusting the blending ratio of the polyol and the polyisocyanate.

From the standpoint that a time taken for the reaction of the base material and the curing agent is short, the weight average molecular weight of the urethane polyol is preferably equal to or greater than 4000 and particularly preferably equal to or greater than 4500. In light of adhesion of the reinforcing layer 8, the weight average molecular weight of the urethane polyol is preferably equal to or less than 10000 and particularly preferably equal to or less than 9000.

In light of adhesion of the reinforcing layer 8, the hydroxyl value (mg KOH/g) of the urethane polyol is preferably equal to or greater than 15 and particularly preferably equal to or greater than 73. From the standpoint that a time taken for the reaction of the base material and the curing agent is short, the hydroxyl value of the urethane polyol is preferably equal to or less than 130 and particularly preferably equal to or less than 120.

The base material may contain, together with a urethane polyol, a polyol that does not have any urethane bond. The aforementioned polyol that is the material for the urethane polyol can be used in the base material. Polyols compatible with the urethane polyol are preferred. From the standpoint that a time taken for the reaction of the base material and the curing agent is short, the proportion of the urethane polyol in the base material on the solid content basis is preferably equal to or greater than 50% by weight and particularly preferably equal to or greater than 80% by weight. Ideally, the proportion is 100% by weight.

The curing agent contains a polyisocyanate or a derivative thereof. The aforementioned polyisocyanate that is the material for the urethane polyol can be used in the curing agent.

The reinforcing layer 8 may include additives such as a coloring agent (typically, titanium dioxide), a phosphate-based stabilizer, an antioxidant, a light stabilizer, a fluorescent brightener, an ultraviolet absorber, an anti-blocking agent, and the like. The additives may be added to the base material of the two-component curing type thermosetting resin, or may be added to the curing agent of the two-component curing type thermosetting resin.

The reinforcing layer 8 is obtained by applying, to the surface of the mid layer 6, a liquid that is prepared by dissolving or dispersing the base material and the curing agent in a solvent. In light of workability, application with a spray gun is preferred. After the application, the solvent is volatilized to permit a reaction of the base material with the curing agent, thereby forming the reinforcing layer 8. Examples of preferable solvents include toluene, isopropyl alcohol, xylene, methyl ethyl ketone, methyl isobutyl ketone, ethylene glycol monomethyl ether, ethylbenzene, propylene glycol monomethyl ether, isobutyl alcohol, and ethyl acetate.

In light of feel at impact, the golf ball 2 has an amount of compressive deformation CD of preferably 2.3 mm or greater, more preferably 2.5 mm or greater, and particularly preferably 2.7 mm or greater. In light of resilience performance, the amount of compressive deformation CD is preferably equal to or less than 3.5 mm, more preferably equal to or less than 3.3 mm, and particularly preferably equal to or less than 3.1 mm.

At measurement of the amount of compressive deformation, first, the golf ball 2 is placed on a hard plate made of metal. Next, a cylinder made of metal gradually descends toward the golf ball 2. The golf ball 2, squeezed between the bottom face of the cylinder and the hardplate, becomes deformed. A migration distance of the cylinder, starting from the state in which an initial load of 98 N is applied to the golf ball 2 up to the state in which a final load of 1274 N is applied thereto, is measured.

EXAMPLES

Example 1

A rubber composition was obtained by kneading 100 parts by weight of a high-cis polybutadiene (trade name "BR-730", manufactured by JSR Corporation), 36 parts by weight of zinc diacrylate (trade name "Sanceler SR", manufactured by SANSHIN CHEMICAL INDUSTRY CO., LTD.), 5 parts by weight of zinc oxide, an appropriate amount of barium sulfate, 0.32 parts by weight of 2-naphthalenethiol, 0.8 parts by weight of dicumyl peroxide, and 10 parts by weight of zinc stearate. This rubber composition was placed into a mold including upper and lower mold halves each having a hemispherical cavity, and heated at 170° C. for 25 minutes to obtain a core with a diameter of 39.9 mm. The amount of barium sulfate was adjusted such that the weight of a golf ball is 45.6 g.

A resin composition was obtained by kneading 55 parts by weight of an ionomer resin (the aforementioned "Surlyn 8945"), 45 parts by weight of another ionomer resin (the aforementioned "Himilan AM7329"), and 3 parts by weight of titanium dioxide with a twin-screw kneading extruder. The core was placed into a mold. The core was covered with the resin composition by injection molding to form a mid layer with a thickness of 1.0 mm.

A paint composition (trade name "POLIN 750LE", manufactured by SHINTO PAINT CO., LTD.) including a two-component curing type epoxy resin as a base polymer was prepared. The base material liquid of this paint composition includes 30 parts by weight of a bisphenol A type solid epoxy resin and 70 parts by weight of a solvent. The curing agent liquid of this paint composition includes 40 parts by weight of a modified polyamide amine, 55 parts by weight of a solvent, and 5 parts by weight of titanium oxide. The weight ratio of the base material liquid to the curing agent liquid is 1/1. This paint composition was applied to the surface of the mid layer with a spray gun, and kept at 23° C. for 12 hours to obtain a reinforcing layer with a thickness of 10 μm.

A resin composition was obtained by kneading 100 parts by weight of a thermoplastic polyurethane elastomer (the aforementioned "Elastollan NY82A"), 0.2 parts by weight of a hindered amine light stabilizer (trade name "TINUVIN 770", manufactured by Ciba Japan K.K.), 4 parts by weight of titanium dioxide, and 0.04 parts by weight of ultramarine blue with a twin-screw kneading extruder. Half shells were formed from this resin composition by compression molding. The sphere consisting of the core, the mid layer, and the reinforcing layer was covered with two of these half shells. The sphere and the half shells were placed into a final mold that includes upper and lower mold halves each having a hemispherical cavity and that has a large number of pimples on its cavity face. A cover was obtained by compression molding. The thickness of the cover was 0.4 mm. Dimples having a shape that is the inverted shape of the pimples were formed on the cover. A clear paint including a two-component curing type polyurethane as a base material was applied to this cover to obtain a golf ball of Example 1 with a diameter of 42.7 mm.

Examples 2 to 17 and Comparative Examples 1 to 4

Golf balls of Examples 2 to 17 and Comparative Examples 1 to 4 were obtained in the same manner as Example 1, except the specifications of the core, the mid layer, and the cover were as shown in Tables 10 to 13 below. The composition of the core is shown in detail in Tables 1 to 3 below. The composition of the mid layer is shown in detail in Table 4 below. The composition of the cover is shown in detail in Table 5 below. The hardness distribution of the core is shown in Tables 6 to 9 below.

Comparative Example 5

A rubber composition was obtained by kneading 100 parts by weight of a high-cis polybutadiene (the aforementioned "BR-730"), 23 parts by weight of zinc diacrylate (the aforementioned "Sanceler SR"), 5 parts by weight of zinc oxide, an appropriate amount of barium sulfate, 0.5 parts by weight of bis(pentabromophenyl)disulfide, and 0.8 parts by weight of dicumyl peroxide. This rubber composition was placed into a mold including upper and lower mold halves each having a hemispherical cavity, and heated at 170° C. for 25 minutes to obtain a center with a diameter of 25.0 mm. The amount of barium sulfate was adjusted such that the weight of a golf ball is 45.6 g.

A rubber composition was obtained by kneading 100 parts by weight of a high-cis polybutadiene (the aforementioned "BR-730"), 35.5 parts by weight of zinc diacrylate (the aforementioned "Sanceler SR"), 5 parts by weight of zinc oxide, an appropriate amount of barium sulfate, 0.5 parts by weight of bis(pentabromophenyl)disulfide, and 0.8 parts by weight of dicumyl peroxide. Half shells were formed from this rubber composition by compression molding. The center was covered with two of these half shells. The center and the half shells were placed into a mold including upper and lower mold halves each having a hemispherical cavity. The center and the half shells were heated at 170° C. for 25 minutes to obtain a core. An envelope layer was formed from the half shells. The diameter of the core was 39.6 mm. The core was covered with a mid layer and a cover that are the same as in Example 1. Further, a clear paint that is the same as in Example 1 was applied to the cover to obtain a golf ball of Comparative Example 5 with a diameter of 42.7 mm.

[Hit with Driver (W#1)]

A driver with a titanium head (trade name "XXIO", manufactured by SRI Sports Limited, shaft hardness: S, loft angle: 10.0°) was attached to a swing machine manufactured by True Temper Co. A golf ball was hit under the condition of a head speed of 45 m/sec. The spin rate was measured immediately after the hit. Further, the distance from the launch point to the stop point was measured. The average value of data obtained by 10 measurements is shown in Tables 10 to 13 below.

[Hit with Sand Wedge (SW)]

A sand wedge (SW) was attached to the above swing machine. A golf ball was hit under the condition of a head speed of 21 m/sec. The backspin rate was measured immediately after the hit. The average value of data obtained by 10 measurements is shown in Tables 10 to 13 below.

[Durability]

A golf ball was kept in the environment of 23° C. for 12 hours. The above driver was attached to the above swing machine. The golf ball was repeatedly hit under the condition of a head speed of 45 m/sec. The number of hits required to break the golf ball was counted. The average value of data obtained by 12 measurements is shown as an index in Tables 10 to 13 below.

TABLE 1

Composition of Core

| | A | B | C | D | E | F |
|---|---|---|---|---|---|---|
| BR-730 | 100 | 100 | 100 | 100 | 100 | 100 |
| Sanceler SR | 36 | 35 | 36 | 36 | 37 | 38 |
| Zinc oxide | 5 | 5 | 5 | 5 | 5 | 5 |
| Barium sulfate | Appropriate amount | | | | | |
| 2-naphthalenethiol | 0.32 | 0.32 | 0.32 | 0.32 | 0.32 | 0.32 |
| Dicumyl peroxide | 0.8 | 0.8 | 0.8 | 0.8 | 0.8 | 0.8 |
| Zinc stearate | 10 | 0.0 | 0.5 | 2 | 20 | 30 |
| Total amount of carboxylate | 10 | 0.0 | 0.5 | 2 | 20 | 30 |

TABLE 2

Composition of Core

| | G | H | I | J | K | L |
|---|---|---|---|---|---|---|
| BR-730 | 100 | 100 | 100 | 100 | 100 | 100 |
| Sanceler SR | 39 | 39 | 40 | 39 | 40 | 39 |
| Zinc oxide | 5 | 5 | 5 | 5 | 5 | 5 |
| Barium sulfate | Appropriate amount | | | | | |
| 2-naphthalenethiol | 0.32 | 0.32 | 0.32 | 0.32 | 0.32 | — |
| Bis(pentabromophenyl)disulfide | — | — | — | — | — | 0.3 |
| Dicumyl peroxide | 0.8 | 0.8 | 0.8 | 0.8 | 0.8 | 0.8 |
| Zinc stearate | 45 | — | — | — | — | 10 |
| Zinc octoate | — | 5 | 10 | — | — | — |

TABLE 2-continued

Composition of Core

|  | G | H | I | J | K | L |
|---|---|---|---|---|---|---|
| Zinc myristate | — | — | — | 5 | 10 | — |
| Total amount of carboxylate | 45 | 5 | 10 | 5 | 10 | 10 |

TABLE 3

Composition of Core

|  | M | N | O | P | Q |
|---|---|---|---|---|---|
| BR-730 | 100 | 100 | 100 | 100 | 100 |
| Sanceler SR | — | 37 | 38 | 23 | 35.5 |
| ZN-DA90S | 36 | — | — | — | — |
| Zinc oxide | 5 | 5 | 5 | 5 | 5 |
| Barium sulfate | | Appropriate amount | | | |
| 2-naphthalenethiol | 0.32 | 0.32 | 0.32 | — | — |
| Bis (pentabromophenyl) disulfide | — | — | — | 0.5 | 0.5 |
| Dicumyl peroxide | 0.8 | 0.8 | 0.8 | 0.8 | 0.8 |
| Zinc stearate | 10 | 10 | 10 | — | — |
| Total amount of carboxylate | 13.6 | 10 | 10 | 0.0 | 0.0 |

The details of the compounds listed in Tables 1 to 3 are as follows.

BR-730: a high-cis polybutadiene manufactured by JSR Corporation (cis-1,4-bond content: 96% by weight, 1,2-vinyl bond content: 1.3% by weight, Mooney viscosity ($ML_{1+4}$ (100° C.)): 55, molecular weight distribution (Mw/Mn): 3)

Sanceler SR: zinc diacrylate manufactured by SANSHIN CHEMICAL INDUSTRY CO., LTD. (a product coated with 10% by weight of stearic acid)

ZN-DA90S: zinc diacrylate manufactured by Nihon Jyoryu Kogyo Co., Ltd. (a product coated with 10% by weight of zinc stearate)

Zinc oxide: trade name "Ginrei R" manufactured by Toho Zinc Co., Ltd.

Barium sulfate: trade name "Barium sulfate BD" manufactured by Sakai Chemical Industry Co., Ltd.

2-naphthalenethiol: a product of Tokyo Chemical Industry Co., Ltd.

Bis(pentabromophenyl)disulfide: a product of Kawaguchi Chemical Industry Co., LTD.

Dicumyl peroxide: trade name "Percumyl D" manufactured by NOF Corporation

Zinc stearate: a product of Wako Pure Chemical Industries, Ltd.

Zinc octoate: a product of Mitsuwa Chemicals Co., Ltd.

Zinc myristate: a product of Wako Pure Chemical Industries, Ltd.

TABLE 4

Composition of Mid Layer

|  | M1 | M2 | M3 |
|---|---|---|---|
| Surlyn 8945 | 55 | 47 | 25 |
| Himilan AM7329 | 45 | 45 | 45 |
| Rabalon T3221C | — | 8 | 30 |
| Titanium dioxide | 3 | 3 | 3 |
| Hardness (Shore D) | 65 | 58 | 47 |

TABLE 5

Composition of Cover

|  | C1 | C2 | C3 | C4 |
|---|---|---|---|---|
| Elastollan NY82A | 100 | — | — | — |
| Elastollan NY85A | — | 50 | — | — |
| Elastollan NY90A | — | 50 | — | — |
| Elastollan NY97A | — | — | 100 | — |
| Surlyn 8945 | — | — | — | 40 |
| Himilan AM7329 | — | — | — | 55 |
| Rabalon T3221C | — | — | — | 5 |
| TINUVIN 770 | 0.2 | 0.2 | 0.2 | 0.2 |
| Titanium dioxide | 4 | 4 | 4 | 4 |
| Ultramarine blue | 0.04 | 0.04 | 0.04 | 0.04 |
| Hardness (Shore D) | 29 | 36 | 47 | 60 |

TABLE 6

Hardness Distribution

|  | Comp. Ex. 1 | Ex. 1 | Comp. Ex. 2 | Ex. 2 | Ex. 3 | Ex. 4 |
|---|---|---|---|---|---|---|
| H(0) | 57.5 | 57.0 | 57.0 | 57.0 | 56.0 | 55.5 |
| H(12.5) | 61.0 | 68.0 | 67.5 | 62.5 | 59.0 | 60.5 |
| H(25) | 65.5 | 73.0 | 72.0 | 69.0 | 62.0 | 63.0 |
| H(37.5) | 68.0 | 74.0 | 73.0 | 70.5 | 65.5 | 66.0 |
| H(50) | 70.0 | 74.0 | 74.0 | 72.0 | 69.0 | 68.5 |
| H(62.5) | 71.5 | 74.0 | 74.5 | 73.0 | 71.0 | 70.0 |
| H(75) | 81.0 | 78.0 | 78.0 | 79.5 | 80.0 | 74.5 |
| H(87.5) | 85.0 | 82.0 | 82.5 | 83.5 | 82.0 | 77.0 |
| H(100) | 89.0 | 87.0 | 88.0 | 88.5 | 86.0 | 83.0 |

TABLE 7

Hardness Distribution

|  | Comp. Ex. 3 | Ex. 5 | Ex. 6 | Ex. 7 | Ex. 8 | Ex. 9 |
|---|---|---|---|---|---|---|
| H(0) | 66.0 | 56.5 | 55.5 | 57.0 | 56.0 | 60.0 |
| H(12.5) | 69.0 | 59.5 | 59.0 | 60.5 | 59.5 | 62.5 |
| H(25) | 71.0 | 64.5 | 64.0 | 65.0 | 64.5 | 64.5 |
| H(37.5) | 72.0 | 67.0 | 67.0 | 68.0 | 67.5 | 67.5 |
| H(50) | 72.0 | 70.0 | 69.5 | 70.0 | 69.5 | 70.0 |
| H(62.5) | 73.0 | 72.0 | 72.0 | 72.0 | 72.0 | 71.5 |
| H(75) | 74.5 | 80.5 | 80.0 | 80.5 | 80.5 | 80.0 |
| H(87.5) | 77.0 | 85.0 | 84.0 | 85.0 | 84.5 | 83.0 |
| H(100) | 79.0 | 89.0 | 87.0 | 89.0 | 87.5 | 87.0 |

TABLE 8

Hardness Distribution

|  | Ex. 10 | Ex. 11 | Ex. 12 | Ex. 13 | Ex. 14 |
|---|---|---|---|---|---|
| H (0) | 57.0 | 58.0 | 58.0 | 57.5 | 57.5 |
| H (12.5) | 61.0 | 61.5 | 61.5 | 61.0 | 61.0 |
| H (25) | 65.0 | 65.5 | 66.0 | 65.5 | 65.5 |
| H (37.5) | 67.5 | 68.0 | 68.0 | 68.0 | 68.0 |
| H (50) | 70.0 | 70.0 | 70.5 | 70.0 | 70.0 |
| H (62.5) | 73.0 | 72.0 | 72.0 | 71.5 | 71.5 |

TABLE 8-continued

Hardness Distribution

| | Ex. 10 | Ex. 11 | Ex. 12 | Ex. 13 | Ex. 14 |
|---|---|---|---|---|---|
| H (75) | 80.5 | 81.5 | 81.5 | 81.0 | 81.0 |
| H (87.5) | 85.0 | 85.5 | 86.0 | 85.0 | 85.0 |
| H (100) | 89.0 | 89.5 | 90.0 | 89.0 | 89.0 |

TABLE 9

Hardness Distribution

| | Ex. 15 | Ex. 16 | Ex. 17 | Comp. Ex. 4 | Comp. Ex. 5 |
|---|---|---|---|---|---|
| H (0) | 57.5 | 57.5 | 57.5 | 57.5 | 56.0 |
| H (12.5) | 61.0 | 61.0 | 61.0 | 61.0 | 58.0 |
| H (25) | 65.5 | 65.5 | 65.5 | 65.5 | 59.0 |
| H (37.5) | 68.0 | 68.0 | 68.0 | 68.0 | 60.0 |
| H (50) | 70.0 | 70.0 | 70.0 | 70.0 | 64.0 |
| H (62.5) | 71.5 | 71.5 | 71.5 | 71.5 | 68.0 |
| H (75) | 81.0 | 81.0 | 81.0 | 81.0 | 79.5 |
| H (87.5) | 85.0 | 85.0 | 85.0 | 85.0 | 81.0 |
| H (100) | 89.0 | 89.0 | 89.0 | 89.0 | 88.0 |

TABLE 10

Result of Evaluation

| | Comp. Ex. 1 | Comp. Ex. 2 | Ex. 1 | Ex. 2 | Ex. 3 | Ex. 4 |
|---|---|---|---|---|---|---|
| Core (center) | | | | | | |
| Composition | A | B | C | D | E | F |
| Temperature (° C.) | 170 | 170 | 170 | 170 | 170 | 170 |
| Time (min) | 25 | 25 | 25 | 25 | 25 | 25 |
| Diameter (mm) | 39.9 | 39.9 | 39.9 | 39.9 | 39.9 | 39.9 |
| Envelope layer | | | | | | |
| Composition | — | — | — | — | — | — |
| Temperature (° C.) | — | — | — | — | — | — |
| Time (min) | — | — | — | — | — | — |
| Thickness (mm) | — | — | — | — | — | — |
| H(100) − H(0) | 31.5 | 30.0 | 31.0 | 31.5 | 30.0 | 27.5 |
| $R^2$ | 0.97 | 0.86 | 0.89 | 0.96 | 0.98 | 0.98 |
| Gradient a | 0.31 | 0.23 | 0.24 | 0.28 | 0.31 | 0.25 |
| Mid layer | | | | | | |
| Composition | M1 | M1 | M1 | M1 | M1 | M1 |
| Hardness Hm (Shore D) | 65 | 65 | 65 | 65 | 65 | 65 |
| Thickness (mm) | 1.0 | 1.0 | 1.0 | 1.0 | 1.0 | 1.0 |
| Cover | | | | | | |
| Composition | C1 | C1 | C1 | C1 | C1 | C1 |
| Hardness Hc (Shore D) | 29 | 29 | 29 | 29 | 29 | 29 |
| Thickness (mm) | 0.4 | 0.4 | 0.4 | 0.4 | 0.4 | 0.4 |
| Hm − Hc | 36 | 36 | 36 | 36 | 36 | 36 |
| Deformation CD (mm) | 2.8 | 2.8 | 2.8 | 2.8 | 2.8 | 2.8 |
| W#1 spin rate (rpm) | 3050 | 3200 | 3170 | 3100 | 3000 | 3100 |
| W#1 flight distance (m) | 242 | 235 | 236 | 241 | 243 | 241 |
| SW spin rate (rpm) | 6700 | 6750 | 6750 | 6700 | 6650 | 6700 |
| Durability | 107 | 100 | 101 | 110 | 107 | 105 |

TABLE 11

Result of Evaluation

| | Comp. Ex. 3 | Ex. 5 | Ex. 6 | Ex. 7 | Ex. 8 | Ex. 9 |
|---|---|---|---|---|---|---|
| Core (center) | | | | | | |
| Composition | G | H | I | J | K | L |
| Temperature (° C.) | 170 | 170 | 170 | 170 | 170 | 170 |
| Time (min) | 25 | 25 | 25 | 25 | 25 | 25 |
| Diameter (mm) | 39.9 | 39.9 | 39.9 | 39.9 | 39.9 | 39.9 |
| Envelope layer | | | | | | |
| Composition | — | — | — | — | — | — |
| Temperature (° C.) | — | — | — | — | — | — |
| Time (min) | — | — | — | — | — | — |
| Thickness (mm) | — | — | — | — | — | — |
| H(100) − H(0) | 13.0 | 32.5 | 31.5 | 32.0 | 31.5 | 27.0 |
| $R^2$ | 0.95 | 0.98 | 0.99 | 0.97 | 0.98 | 0.96 |
| Gradient a | 0.11 | 0.32 | 0.32 | 0.32 | 0.32 | 0.27 |
| Mid layer | | | | | | |
| Composition | M1 | M1 | M1 | M1 | M1 | M1 |
| Hardness Hm (Shore D) | 65 | 65 | 65 | 65 | 65 | 65 |
| Thickness (mm) | 1.0 | 1.0 | 1.0 | 1.0 | 1.0 | 1.0 |
| Cover | | | | | | |
| Composition | C1 | C1 | C1 | C1 | C1 | C1 |
| Hardness Hc (Shore D) | 29 | 29 | 29 | 29 | 29 | 29 |
| Thickness (mm) | 0.4 | 0.4 | 0.4 | 0.4 | 0.4 | 0.4 |
| Hm − Hc | 36 | 36 | 36 | 36 | 36 | 36 |
| Deformation CD (mm) | 2.8 | 2.8 | 2.8 | 2.8 | 2.8 | 2.8 |
| W#1 spin rate (rpm) | 3250 | 3000 | 2950 | 3050 | 3000 | 3100 |
| W#1 flight distance (m) | 234 | 243 | 244 | 242 | 243 | 240 |
| SW spin rate (rpm) | 6750 | 6700 | 6650 | 6700 | 6650 | 6750 |
| Durability | 104 | 109 | 110 | 108 | 109 | 110 |

TABLE 12

Result of Evaluation

| | Ex. 10 | Ex. 11 | Ex. 12 | Ex. 13 | Ex. 14 |
|---|---|---|---|---|---|
| Core (center) | | | | | |
| Composition | M | N | O | A | A |
| Temperature (° C.) | 170 | 170 | 170 | 170 | 170 |
| Time (min) | 25 | 25 | 25 | 25 | 25 |
| Diameter (mm) | 39.9 | 39.9 | 39.9 | 39.9 | 39.9 |
| Envelope layer | | | | | |
| Composition | | | | | |
| Temperature (° C.) | | | | | |
| Time (min) | | | | | |
| Thickness (mm) | | | | | |
| H (100) − H (0) | 32.0 | 31.5 | 31.5 | 31.5 | 31.5 |
| $R^2$ | 0.98 | 0.96 | 0.96 | 0.97 | 0.97 |
| Gradient a | 0.32 | 0.31 | 0.31 | 0.31 | 0.31 |
| Mid layer | | | | | |
| Composition | M1 | M2 | M3 | M1 | M1 |
| Hardness Hm (Shore D) | 65 | 58 | 47 | 65 | 65 |
| Thickness (mm) | 1.0 | 1.0 | 1.0 | 1.0 | 1.0 |

TABLE 12-continued

Result of Evaluation

| | Ex. 10 | Ex. 11 | Ex. 12 | Ex. 13 | Ex. 14 |
|---|---|---|---|---|---|
| Cover | | | | | |
| Composition | C1 | C1 | C1 | C2 | C3 |
| Hardness Hc (Shore D) | 29 | 29 | 29 | 36 | 47 |
| Thickness (mm) | 0.4 | 0.4 | 0.4 | 0.4 | 0.4 |
| Hm - Hc | 36 | 29 | 18 | 29 | 18 |
| Deformation CD (mm) | 2.8 | 2.8 | 2.8 | 2.8 | 2.7 |
| W#1 spin rate (rpm) | 3000 | 3150 | 3200 | 3000 | 2900 |
| W#1 flight distance (m) | 243 | 238 | 235 | 243 | 245 |
| SW spin rate (rpm) | 6700 | 6950 | 7100 | 6600 | 6450 |
| Durability | 108 | 115 | 120 | 100 | 97 |

TABLE 13

Result of Evaluation

| | Ex. 15 | Ex. 16 | Ex. 17 | Comp. Ex. 4 | Comp. Ex. 5 |
|---|---|---|---|---|---|
| Core (center) | | | | | |
| Composition | A | A | A | A | P |
| Temperature (° C.) | 170 | 170 | 170 | 170 | 170 |
| Time (min) | 25 | 25 | 25 | 25 | 25 |
| Diameter (mm) | 40.1 | 39.7 | 38.7 | 39.9 | 25.0 |
| Envelope layer | | | | | |
| Composition | | | | | Q |
| Temperature (° C.) | | | | | 170 |
| Time (min) | | | | | 25 |
| Thickness (mm) | | | | | 7.3 |
| H (100) - H (0) | 31.5 | 31.5 | 31.5 | 31.5 | 32.0 |
| $R^2$ | 0.97 | 0.97 | 0.97 | 0.97 | 0.91 |
| Gradient a | 0.31 | 0.31 | 0.31 | 0.31 | 0.33 |
| Mid layer | | | | | |
| Composition | M1 | M1 | M1 | M2 | M1 |
| Hardness Hc (Shore D) | 65 | 65 | 65 | 58 | 65 |
| Thickness (mm) | 1.0 | 1.0 | 1.0 | 1.0 | 1.0 |
| Cover | | | | | |
| Composition | C1 | C1 | C1 | C4 | C1 |
| Hardness Hc (Shore D) | 29 | 29 | 29 | 60 | 29 |
| Thickness (mm) | 0.3 | 0.5 | 1.0 | 0.4 | 0.4 |
| Hm - Hc | 36 | 36 | 36 | −2 | 36 |
| Deformation CD (mm) | 2.8 | 2.9 | 2.9 | 2.8 | 2.8 |
| W#1 spin rate (rpm) | 2950 | 3100 | 3300 | 2750 | 3100 |
| W#1 flight distance (m) | 244 | 240 | 233 | 248 | 241 |
| SW spin rate (rpm) | 6650 | 7000 | 7200 | 5800 | 6700 |
| Durability | 97 | 110 | 120 | 85 | 82 |

As shown in Tables 10 to 13, the golf balls according to Examples are excellent in various performance characteristics. From the results of evaluation, advantages of the present invention are clear.

The golf ball according to the present invention can be used for playing golf on golf courses and practicing at driving ranges. The above descriptions are merely for illustrative examples, and various modifications can be made without departing from the principles of the present invention.

What is claimed is:

1. A golf ball comprising a spherical core, a mid layer positioned outside the core, and a cover positioned outside the mid layer, wherein the core is formed from a crosslinked rubber composition that includes:
   (a) base rubber;
   (b) a co-crosslinking agent;
   (c) a crosslinking initiator; and
   (d) a carboxylate having a carboxylic acid component that includes 4 to 8 carbon atoms,
wherein the co-crosslinking agent (b) is:
   (b1) an α, β-unsaturated carboxylic acid having 3 to 8 carbon atoms; and/or
   (b2) a metal salt of an α, β-unsaturated carboxylic acid having 3 to 8 carbon atoms,
   the carboxylate (d) is present in an amount that is equal to or greater than 1.0 parts by weight but equal to or less than 10 parts by weight per 100 parts by weight of the base rubber (a),
   the carboxylate carboxylic acid component excludes the α, β-unsaturated carboxylic acid the mid layer has a Shore D hardness Hm that is greater than the cover Shore D hardness Hc,
   the core has a hardness distribution such that if JIS-C hardness values are measured at nine points in the core at intervals of 12.5% of the radius of the core including the core center and core surface, and the hardness values are plotted versus distance in a graph, then $R^2$ of a linear approximation curve obtained by the least-square method is equal to or greater than 0.95,
   a JIS-C hardness H(0) at a central point of the core is equal to or greater than 40 but equal to or less than 70,
   a JIS-C hardness H(100) at a surface of the core is equal to or greater than 78 but equal to or less than 96, and
   a difference (H(100)−H(0)) between the hardness H(100) of the core surface and the hardness H(0) of the core central point is equal to or greater than 15.

2. The golf ball according to claim 1, wherein the rubber composition further includes an organic sulfur compound (e).

3. The golf ball according to claim 1, wherein the rubber composition includes the α, β-unsaturated carboxylic acid (b1), and the rubber composition further includes a metal compound (f).

4. The golf ball according to claim 1, wherein the carboxylate (d) is a fatty acid salt.

5. The golf ball according to claim 4, wherein the carboxylate (d) is a salt of a saturated fatty acid.

6. The golf ball according to claim 1, wherein the organic sulfur compound (e) is a thiophenol, a diphenyl disulfide, a thionaphthol, or a thiuramdisulfide, or a metal salt thereof.

7. The golf ball according to claim 6, wherein the organic sulfur compound (e) is 2-naphthalenethiol.

8. The golf ball according to claim 1, wherein the rubber composition includes the metal salt (b2) of the β, β-unsaturated carboxylic acid.

9. The golf ball according to claim 1, wherein the rubber composition includes 15 parts by weight or greater but 50 parts by weight or less of the co-crosslinking agent (b) per 100 parts by weight of the base rubber (a).

10. The golf ball according to claim 1, wherein the rubber composition includes 0.2 parts by weight or greater but 5.0 parts by weight or less of the crosslinking initiator (c) per 100 parts by weight of the base rubber (a).

11. The golf ball according to claim 1, wherein the rubber composition includes 0.05 parts by weight or greater but 5.0 parts by weight or less of the organic sulfur compound (e) per 100 parts by weight of the base rubber (a).

12. The golf ball according to claim 1, wherein a difference (Hm−Hc) between the mid layer hardness Hm and the cover hardness Hc is equal to or greater than 30.

13. The golf ball according to claim 1, wherein the mid layer hardness Hm is equal to or greater than 55 but equal to or less than 70.

14. The golf ball according to claim 1, wherein the cover hardness He is equal to or greater than 10 but equal to or less than 48.

15. The golf ball according to claim 1, wherein
the mid layer has a thickness that is equal to or greater than 0.5 mm but equal to or less than 1.6 mm, and
the cover has a thickness that is equal to or less than 0.8 mm.

16. The golf ball according to claim 1, wherein
the mid layer is formed from a resin composition,
the cover is formed from a resin composition having a base resin that is different from a the mid layer base resin, and
the golf ball further comprises a reinforcing layer between the mid layer and the cover.

17. The golf ball according to claim 1, wherein
the carboxylate (d) is a fatty acid salt;
the co-crosslinking agent (b) is present in an amount of 15 to 50 parts by weight per 100 parts by weight of the base rubber (a);
the mid layer has a thickness that is equal to or greater than 0.5 mm but equal to or less than 1.6 mm; and
the cover has a thickness that is equal to or less than 0.8 mm.

\* \* \* \* \*